United States Patent
Kuo et al.

(10) Patent No.: US 8,660,839 B2
(45) Date of Patent: Feb. 25, 2014

(54) SYSTEM AND METHOD FOR LEAVING AND TRANSMITTING SPEECH MESSAGES

(75) Inventors: Chih-Chung Kuo, Hsinchu (TW); Shih-Chieh Chien, Taichung (TW); Chung-Jen Chiu, Hsinchu (TW); Hsin-Chang Chang, Changhua (TW)

(73) Assignee: Industrial Technology Research Institute, Hsinchu (TW)

( * ) Notice: Subject to any disclaimer, the term of this patent is extended or adjusted under 35 U.S.C. 154(b) by 978 days.

(21) Appl. No.: 12/726,346

(22) Filed: Mar. 18, 2010

(65) Prior Publication Data

US 2011/0119053 A1     May 19, 2011

(30) Foreign Application Priority Data

Nov. 13, 2009   (TW) ................................ 98138730 A

(51) Int. Cl.
*G10L 19/00*   (2013.01)
*G10L 15/00*   (2013.01)
*G10L 15/26*   (2006.01)

(52) U.S. Cl.
USPC ........................... 704/201; 704/231; 704/235

(58) Field of Classification Search
USPC ......................................... 704/201, 231, 235
See application file for complete search history.

(56) References Cited

U.S. PATENT DOCUMENTS

| | | | |
|---|---|---|---|
| 4,509,186 A * | 4/1985 | Omura et al. ................. 704/231 |
| 4,856,066 A * | 8/1989 | Lemelson ..................... 704/275 |
| 6,324,261 B1 | 11/2001 | Merte |
| 6,507,643 B1 * | 1/2003 | Groner ........................ 379/88.14 |
| 6,678,659 B1 * | 1/2004 | Van Kommer ................ 704/260 |
| 7,327,834 B1 | 2/2008 | Hiers et al. |
| 7,394,405 B2 | 7/2008 | Godden |
| 7,437,287 B2 | 10/2008 | Kim |
| 8,082,510 B2 * | 12/2011 | Patel et al. .................... 715/752 |
| 2003/0028604 A1 * | 2/2003 | Aktas et al. ................... 709/206 |
| 2003/0050778 A1 * | 3/2003 | Nguyen et al. ................ 704/235 |
| 2004/0039596 A1 * | 2/2004 | Geertsen et al. .................. 705/1 |
| 2004/0252679 A1 * | 12/2004 | Williams et al. .............. 370/356 |

(Continued)

FOREIGN PATENT DOCUMENTS

| CN | 101001294 A | 7/2007 |
|---|---|---|
| TW | I242977 | 11/2005 |

(Continued)

OTHER PUBLICATIONS

Koumpis. Automatic voicemail summarisation for mobile messaging. PhD thesis, University of Sheffield, 2002, pp. 1-188.*

(Continued)

*Primary Examiner* — Richemond Dorvil
*Assistant Examiner* — Olujimi Adesanya
(74) *Attorney, Agent, or Firm* — Rabin & Berdo, P.C.

(57) ABSTRACT

A system for leaving and transmitting speech messages automatically analyzes input speech of at least a reminder, fetches a plurality of tag informations, and transmits speech message to at least a message receiver, according to the transmit criterions of the reminder. A command or message parser parses the tag informations at least including at least a reminder ID, at least a transmitted command and at least a speech message. The tag informations are sent to a message composer for being synthesized into a transmitted message. A transmitting controller controls a device switch according to the reminder ID and the transmitted command, to allow the transmitted message send to the message receiver via a transmitting device.

22 Claims, 21 Drawing Sheets

(56) References Cited

U.S. PATENT DOCUMENTS

| | | | |
|---|---|---|---|
| 2007/0116204 A1* | 5/2007 | Doulton | 379/88.14 |
| 2007/0219800 A1* | 9/2007 | Hymel et al. | 704/270 |
| 2008/0056459 A1* | 3/2008 | Vallier et al. | 379/88.12 |
| 2008/0133515 A1* | 6/2008 | Chien et al. | 707/6 |
| 2009/0210229 A1 | 8/2009 | Amento et al. | |
| 2011/0172989 A1* | 7/2011 | Moraes | 704/9 |

FOREIGN PATENT DOCUMENTS

| | | | |
|---|---|---|---|
| TW | 200824408 A | 6/2008 | |
| TW | 200825950 A | 6/2008 | |
| TW | 200922223 A | 5/2009 | |

OTHER PUBLICATIONS

Koumpis, "Automatic Voicemail Summarisation for Mobile Messaging", The Doctoral Dissertation of the University of Sheffield, pp. 1-188, Dec. 31, 2002.

Lu et al., :Mandarin Keyword Detection Method Based on Syllable Padding, NCMMSC6 Shenzhen, Cheng-Chung Liu, pp. 207-210, Nov. 22, 2001.

China Patent Office, Office Action, Patent Application Serial No. CN200910247193.X, Mar. 5, 2013, China.

Taiwan Patent Office, Office Action, Patent Application Serial No. TW098138730, Mar. 18, 2013, Taiwan.

Orion: From On-Line Interaction to Off-line Delegation, Stephanie Seneff, Chian Chuu and D. Scott Cyphers, Proceedings of ICSLP'00, vol. II, pp. 142~145,Beijing, China, Oct. 2000.

* cited by examiner

Date_ : Monday, Tuesday, Wednesday... January, February... 1st day, 2nd day...
Time_ : One o'clock, Two o'clock, Three o'clock, 10 Minutes, 11 Minutes...
Cmd_ : Speak, Say, Remind, Inform....
Whom_ : Daddy, Mother, Brother...
How_ : Call, Mail, Bbroadcast...
F/S_ : But, About, Help Me, Later, In A Moment, Wait A Minute...
Filler_ : Phonetic/Syllable, Filler....
Y/N_ : Yes, Sure, Right, No, Wrong...

FIG. 9

SYSTEM AND METHOD FOR LEAVING AND TRANSMITTING SPEECH MESSAGES

TECHNICAL FIELD

The disclosure generally relates to an system and method for leaving and transmitting speech messages

BACKGROUND

Leaving and transmitting messages has been a common act in daily lives. Some common approaches include leaving a written note, e-mails, telephone message and answering machines. In this type of application, the message leaver is usually different from the message receiver. Another type of application, such as, calendar or electronic calendar, is to remind oneself by, such as, leaving oneself a message. In either application, the contents of message are usually not events for immediate attention; therefore, the message receiver may forget to handle the message accordingly. Or, in some cases, the message receiver cannot receive the message because of the location restriction. In any case, the failure to receive the message or to act upon the message is considered as a big disadvantage, and thus a solution must be devised.

This type of leaving and transmitting messages may also be used in home care system, such as, reminding the elderly of taking medicine and the school kids for doing homework. The integration of the leaving and transmitting messages feature into household robot is another new application. Integrated into robot, the leaving and transmitting message feature may further enhance the effectiveness of home care system.

There are conventional technologies of leaving and transmitting speech messages disclosed. For example, U.S. Pat. No. 6,324,261 disclosed a hardware structure for recording and playing speech messages. In collaboration with sensors, the disclosed technology operates by pressing hardware buttons. The disclosed technology does not perform any message analysis or recombination, and is not actively playing. U.S. Pat. No. 7,327,834 disclosed a message transmission system having communication capability, where the operation requires the user to clearly define the recipient, date, time, event message and transmission message, and so on.

U.S. Pat. No. 7,394,405 disclosed a system for providing location-based notifications. As shown in FIG. 1, in a car 102 installed with a notification system, the operation requires the user to input header information 104 to define notification type, expiration date, importance and speech recording 106, and with the collaboration with a location detection device, such as, GPS, to determine the location of the input device of the notification. When the location of the input device and location 110 of the transmitting notification is within a threshold 108, a notification is transmitted.

China Patent Application No. 200610124296.3 disclosed an intelligent speech recording and reminding system based on speech recognition technology. As shown in FIG. 2, the system comprises a speech receiving module 210, a system control module 220, and a speech output module 230. Based on predefined rules, the system performs speech recognition on the speech signals issued by the user to determine whether the speech is a control speech or a message speech, and performs personalization processing on the speech data and transmits to the user in order to achieve the functions of direct speech control, leaving message, calendar and appointment reminding. In operation, the speech between the two control speeches, i.e., start leaving message and stop leaving message, is the message speech.

Taiwan Patent No. 1242977 disclosed a speech calendar system. As shown in FIG. 3, speech calendar system 300 comprises an internet server 311, a computer telephony integrated server 312, and a speech synthesized server 313. Servers 311, 312, 313 are all connected to a communication network 31. Speech calendar system 300 is able to process the message transmission between the internet and the telephony network. Internet server 311 is connected to Internet 32 for processing communication between Internet user 34 and system 300, such as, e-mails. The e-mail includes a calendar event, and the calendar event includes a message notification and a time setting, where the message notification may be text message, pre-recorded audio file or synthesized audio file from a text message. The audio file may be played in telephony network 33. Computer telephony integrated server 312 is connected to telephony network 33 for processing the telephony response of telephony network user 35 and system 300.

In summary, the above techniques mostly require the user to input the message and information, such as, receiver, date, time, event message and transmission message according to predefined rules, or alternatively to use speech recognition to input speech message according to predefined rules.

SUMMARY

The disclosed exemplary embodiments may provide a system and method for leaving and transmitting speech messages.

In an exemplary embodiment, the disclosed relates to a system for leaving and transmitting speech messages. The system comprises a command or message parser, a transmitting controller, a message composer and at least a message transmitting device. The command or message parser is connected respectively to the transmitting controller and the message composer. The command or message parser parses the input speech of at least a reminder into a plurality of tag information, including at least a reminder ID, at least a transmitted command and at least a speech message. The message composer composes the plurality of tag information into a transmitted speech message. Based on the at least a reminder ID and the at least a transmitted command, the transmitting controller controls a device switch so that the transmitted speech message is transmitted by a message transmitting device to at least a message receiver.

In another exemplary embodiment, the disclosed relates to a method for leaving and transmitting speech messages. The method comprises: parsing at least an input speech of at least a reminder into a plurality of tag information, at least including at least a reminder identity (ID), a transmitted command and at least a message speech; composing the plurality of tag information into a transmitted message speech; and based on the at least a reminder ID and the at least a transmitted command, controlling a device switch so that the transmitted message speech is transmitted by a message transmitting device to at least a message receiver.

The foregoing and other features, aspects and advantages of the exemplary embodiments will become better understood from a careful reading of a detailed description provided herein below with appropriate reference to the accompanying drawings.

BRIEF DESCRIPTION OF THE DRAWINGS

FIG. 9 shows an exemplary schematic view of data structure of mix type text, consistent with certain disclosed embodiments.

DETAILED DESCRIPTION OF THE EXEMPLARY EMBODIMENTS

The disclosed exemplary embodiments provide a system and method for leaving and transmitting speech messages. In the exemplary embodiments, the message leaver may use the natural speech dialogue to input the message to the system of the present invention. The system, after parsing the message, extracts a plurality of tag information, including target message receiver, time, event message, and so on, and according to the intended conditions, such as, designated time frame and transmitting manner, to the target message receiver.

Figure 1:
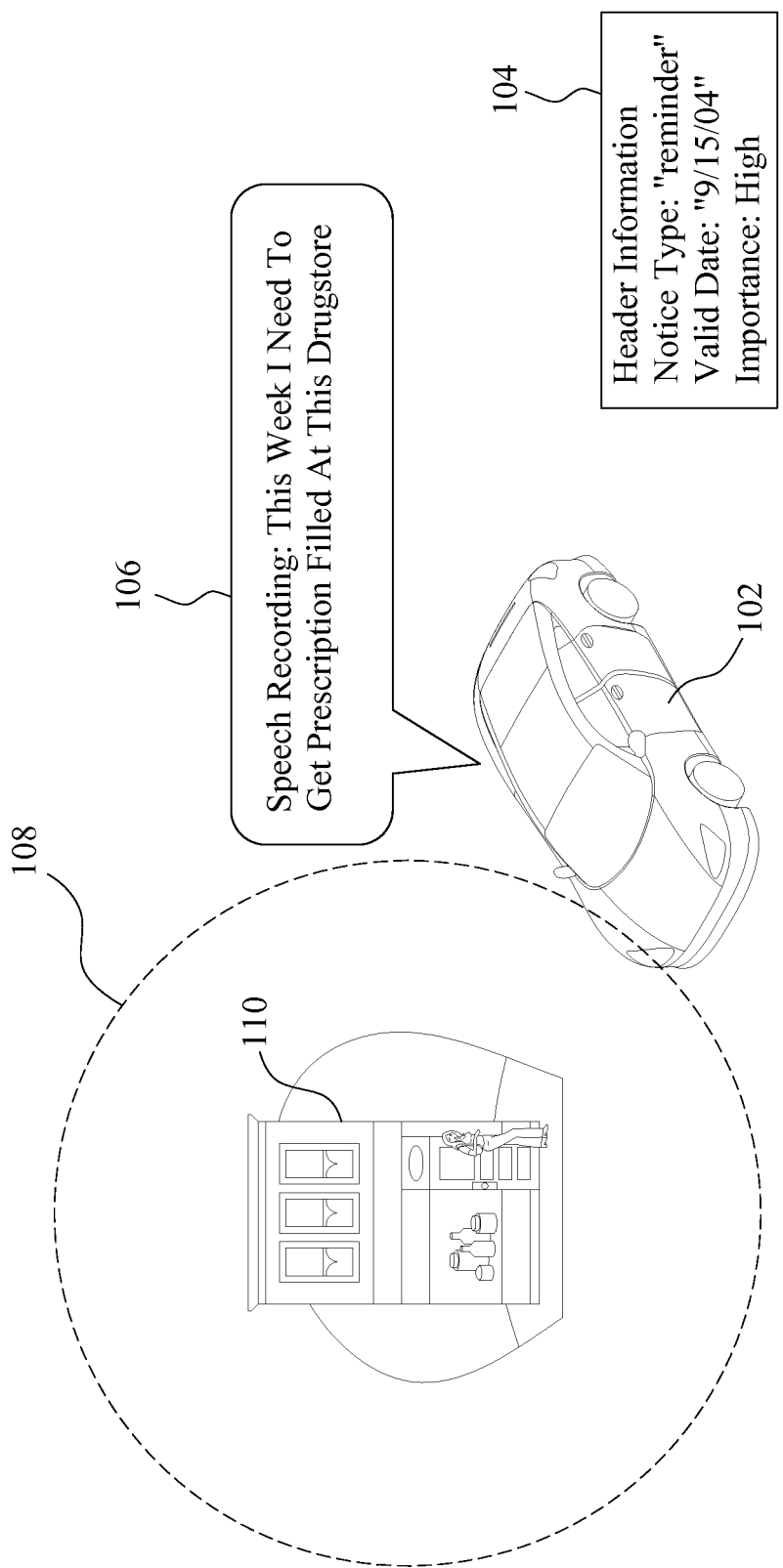
FIG. 1 shows an exemplary schematic view of a location-dependent message notification system.
Figure 2:
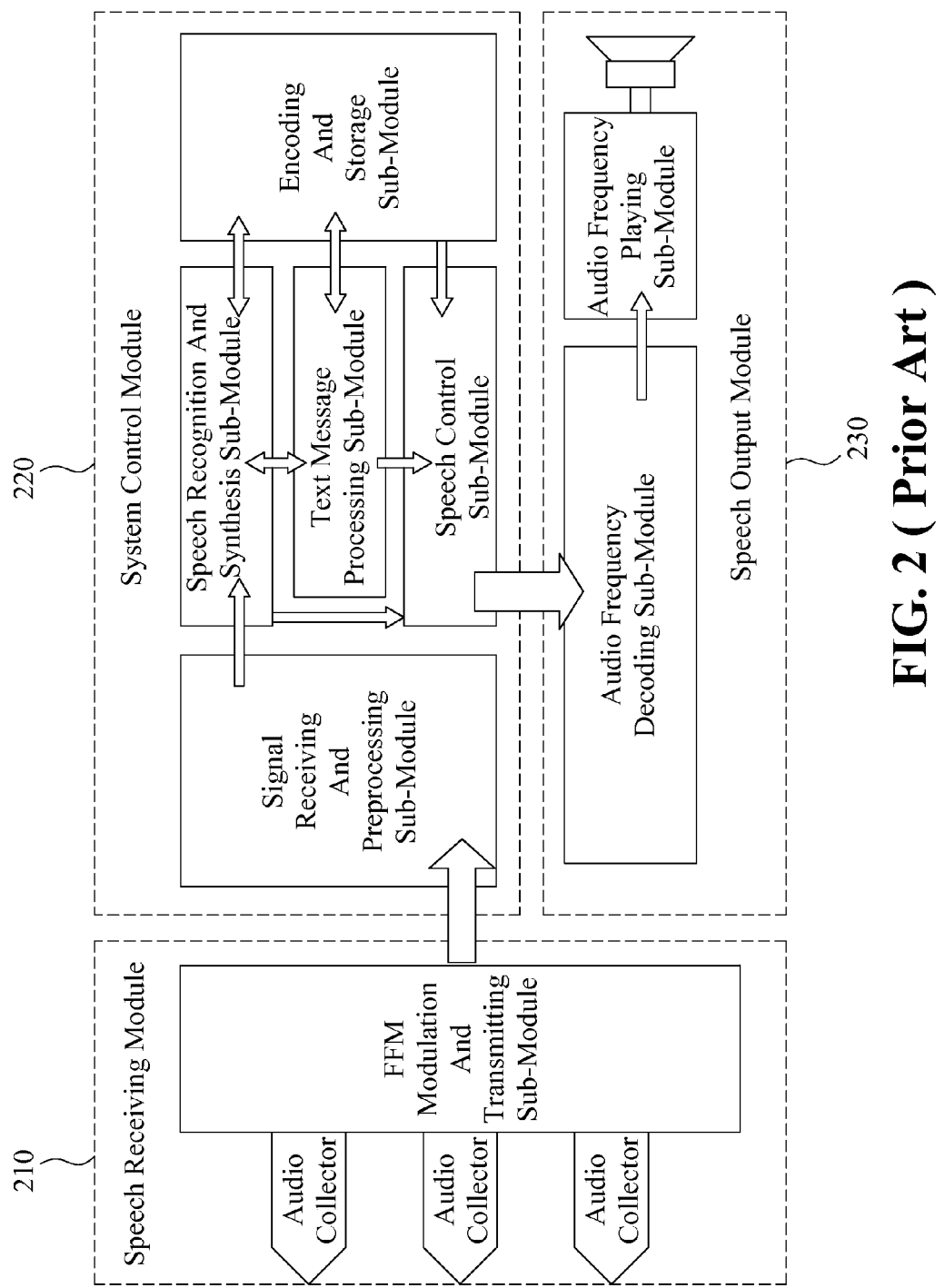
FIG. 2 shows an exemplary schematic view of an ASR-based intelligent home speech recording and reminding system.
Figure 3:
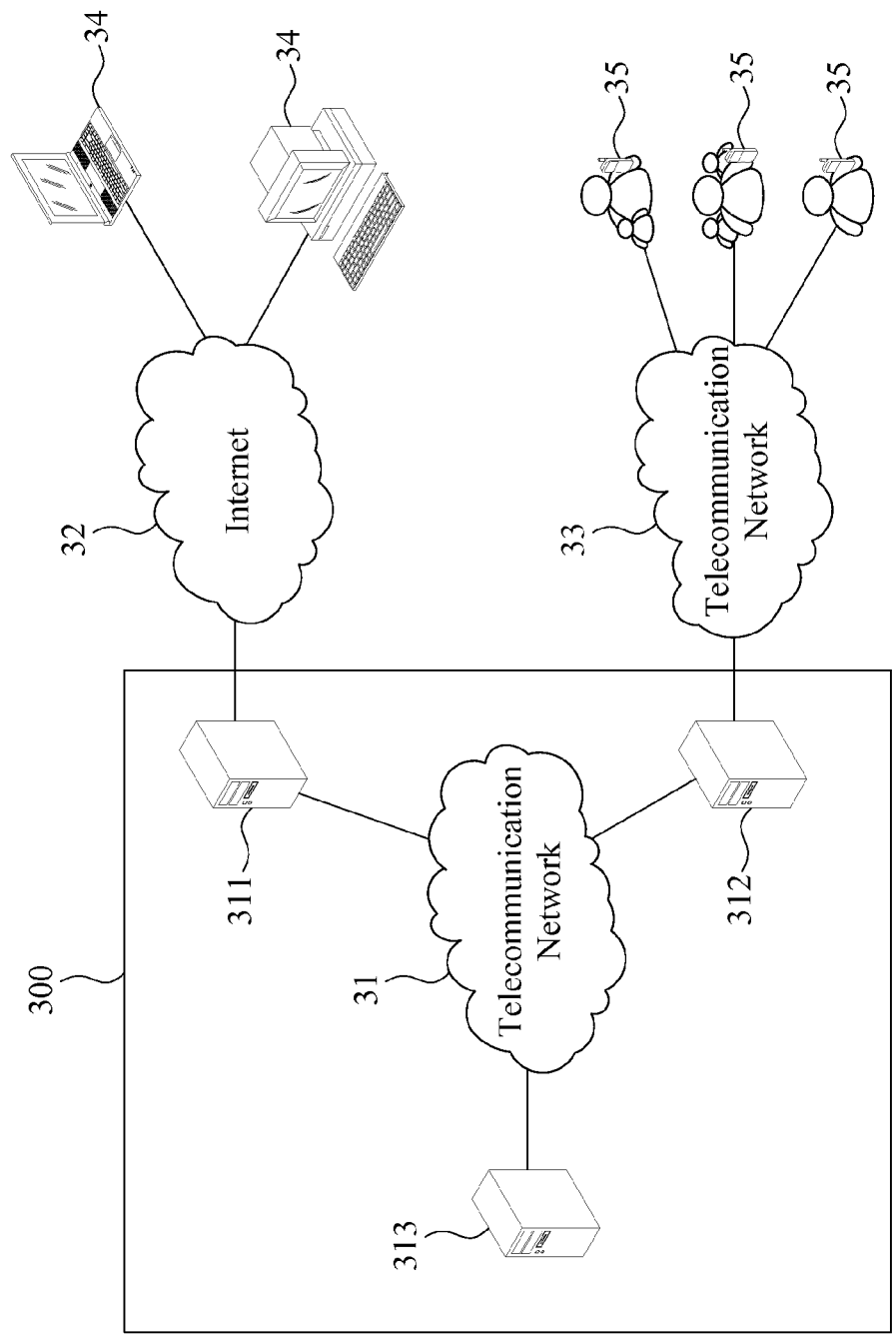
FIG. 3 shows an exemplary schematic view of a speech calendar system.
Figure 4:
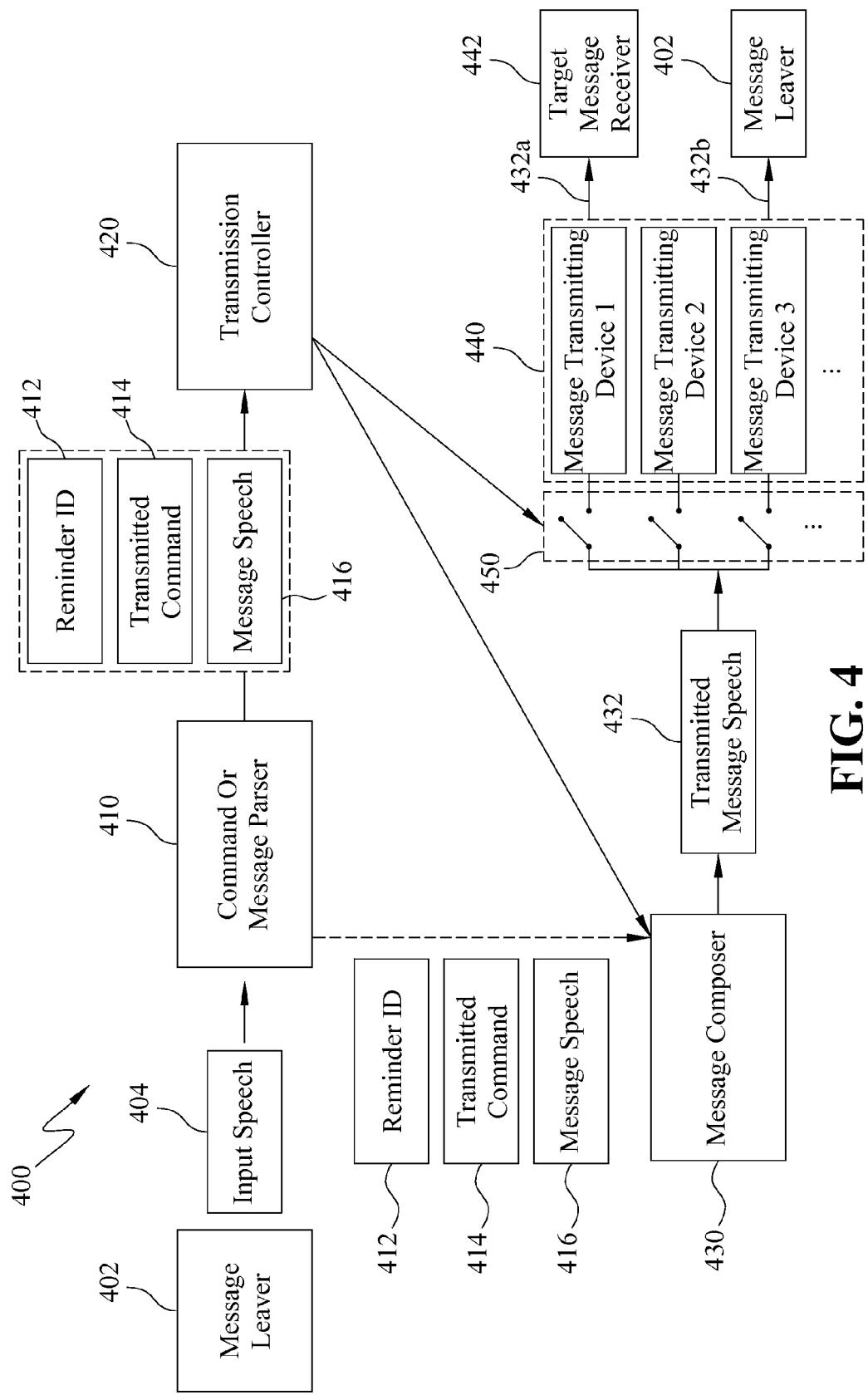
FIG. 4 shows an exemplary schematic view of a system for leaving and transmitting speech messages, consistent with certain disclosed embodiments.

FIG. 4 shows an exemplary schematic view of a system for leaving and transmitting speech messages, consistent with certain disclosed embodiments. In the exemplary embodiment of FIG. 4, system 400 for leaving and transmitting messages comprises a command or message parser 410, a transmitting controller 420, a message composer 430 and at least a message transmitting device 440. Command or message parser 410 is connected respectively to transmitting controller 420 and message composer 430.

Command or message parser 410 parses input speech 404 of at least a reminder 402 into a plurality of tag information, at least including at least a reminder ID 412, at least a transmitted command 414 and at least a message speech 416. The plurality of tag information is outputted to message composer 430 for composing a transmitted message speech 432.

Based on reminder ID 412 and transmitted command 414, transmitting controller 420 controls a device switch 450 so that transmitted message speech 432 is transmitted by one of at least a message transmission device 440, such as, transmitting devices 1-3, to a reminder receiver. For example, if transmitted message speech 432 is a transmitted message 432a, transmitted message 432a is transmitted to target reminder receiver 442. If a feedback message 432b, feedback message 432b is transmitted to reminder leaver 402.

When command or message parser 410 parses input speech 404 of at least a reminder 402, command or message parser 410 may recognize the identity of at least a reminder ID 412. For the entire speech input segment, command or message parser 410 may identify command word segment and segment with phonetic filler according to given grammatical and speech reliability measure, and then distinguishes message filler from garbage filler in the phonetic filler segment. From command word segment, command or message parser 410 may identify all kinds of transmitted command 414. Based on message filler segment, command or message parser 410 may extract at least a message speech 416 from input speech 404.

Figure 5:
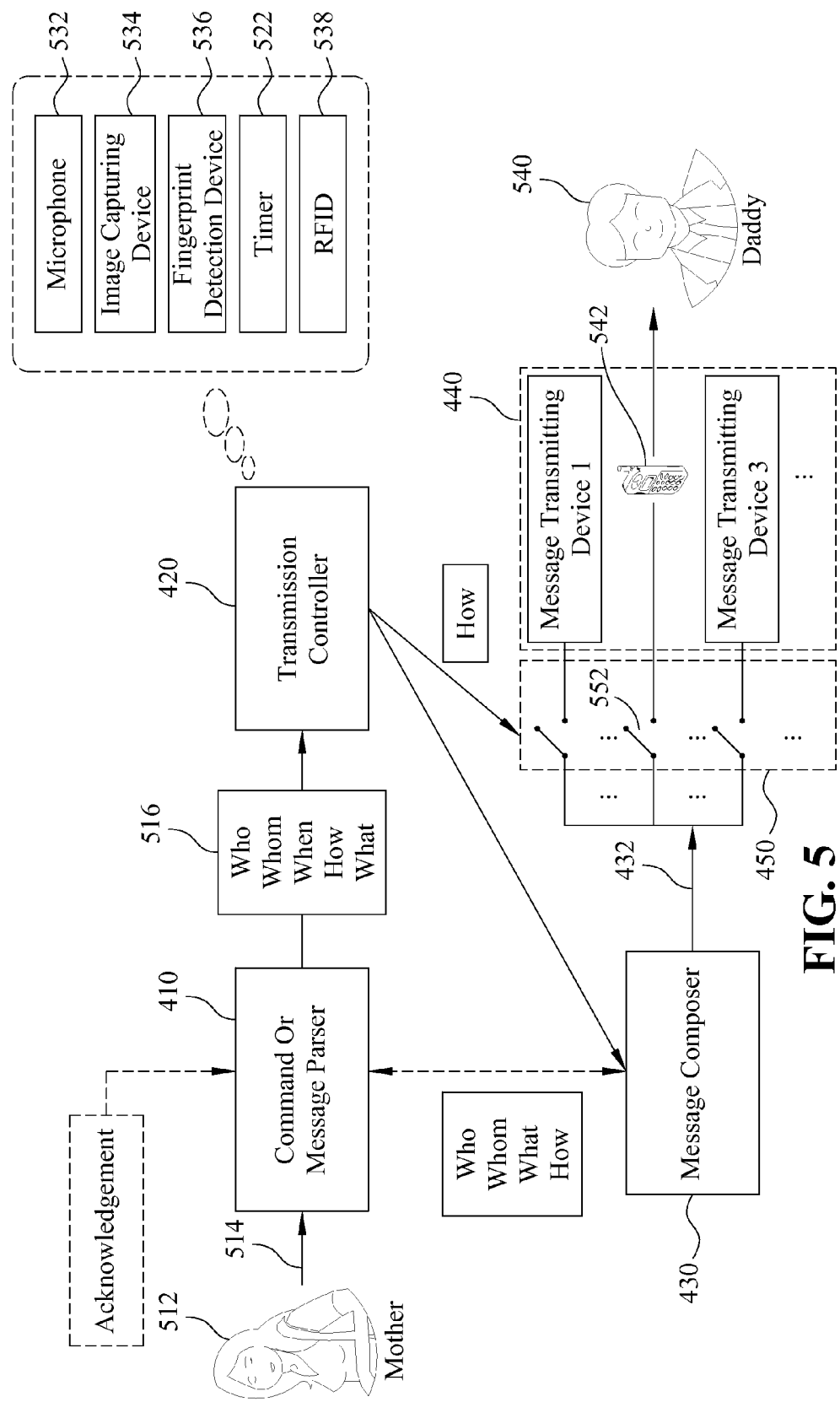
FIG. 5 shows an exemplary schematic view of a leaving message stage and transmitting stage, consistent with certain disclosed embodiments.

The operation of system 400 for leaving and transmitting messages may be divided into two stages, i.e., leaving message and transmitting message. FIG. 5 shows an exemplary schematic view of a leaving message stage and transmitting stage, consistent with certain disclosed embodiments.

In the leaving message stage, the message leaver inputs speech to system 400. In the exemplary embodiment of FIG. 5, a mother 512 inputs a speech 514 of "Time to take out the garbage. Remember to relay this to daddy before 6 PM." Speech 514 is received by command or message parser 410 and parsed into a plurality of tag information 516. In this exemplar, tag information 516 includes: (a) reminder ID (marked as Who), "mother", (b) target message receiver (marked as Whom), "daddy", (c) speech message from Who to Whom (marked as What, or called speech message), "time to take out garbage", (d) when to transmit message to Whom (marked as When), "before 6 PM", and (e) through what message transmission manner to transmit message to Whom (marked as How), "broadcast device", as a system predefined value, where items (d) and (e) are optional. Optional information may be given predefined values automatically by the system. For the entire speech input segment, Who, Whom, When and How are identified command word segments, and What, i.e., speech message, is the identified message filler segment.

After command or message parser 410 parses input speech into a plurality of tag information 516, tag information 516 is passed to transmitting controller 420. At this point, the leaving message stage is completed. Before tag information 516 is passed to transmitting controller 420, command or message parser 410 may also execute a confirmation to confirm the accuracy of tag information 516, such as, by transmitting tag information back and request an acknowledgement.

In the transmitting message stage, after transmitting controller 420 receives tag information 516 passed from command or message parser 410, transmitting controller determines whether conditions (b) and (d) are met. In the above exemplar, this step is to determine whether a "broadcast device" able to transmit the speech to "daddy" "before 6 PM" exists, where Whom (daddy) and When (before 6 PM) are the two conditions that transmitting controller 420 must meet first. After these two conditions are met, the How (broadcast device) is used to perform the speech transmission. The determination of meeting the conditions may be implemented by internal sensors or control circuit connected to external sensors.

In the above exemplar, sensor, such as timer 522, may be used to determine whether the time condition "before 6 PM" is met, and sensors for sensing Whom ("daddy") include, such as, microphone 532, image capturing device 534, fingerprint detection device 536, RFID 538, and so on. Microphone 532 may sense the audio in the surroundings, image capturing device 534 may capture the image of the surroundings, and the user may press on fingerprint detection device 536 for the device to capture the fingerprint, or the user may carry RFID 538 for the system to recognize. All these sensed data may be used to determine whether Whom is present in the surroundings. In this manner, transmitting controller 420 may use the internal sensors or control circuit connected with the external sensors to know the transmission conditions if Whom and When are met.

When transmitting controller 420 learns that the transmission conditions are met, i.e., detecting the Whom is "daddy", and the When is "before 6 PM", transmitting controller 420 passes the aforementioned Who (mother), Whom (daddy), What (Mother's message "time to take out the garbage"), and so on, to message composer 430, and, based on the How (broadcast device) condition, controls a device switch 450, for example, activate a corresponding device switch 552, so that transmitted message speech 432 composed by message composer 430 may be transmitted by a corresponding message transmission device of at least a message transmission device 440, such as, cell phone 542, to target message receiver 540, i.e., the Whom (daddy).

In the above exemplar, after message composer 430 receives Who (mother), Whom (daddy), What (time to take out the garbage), and so on, message composer 430 may select a template from a plurality of templates to compose the message speech. The following is a possible composed transmitted message speech 432 by message composer 430: "daddy, the following is the message from mother, 'time to take out the garbage'". The composed speech is transmitted by a corresponding message transmission device, such as, cell phone 542, through device switch 552 activated by transmitting controller 420 to broadcast. Because transmitting controller 542 has detected the Whom (daddy), therefore, the target message receiver (Whom, daddy) may receive the message left by message leaver (Who, mother). At this point, the message transmission stage is completed.

Figure 6B:
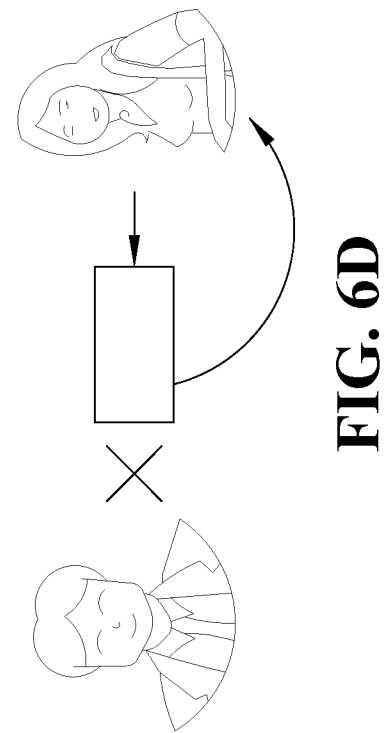
FIGS. 6A-6D show a plurality of exemplary schematic views of transmitting and feedback operation, consistent with certain disclosed embodiments.
Figure 6D:
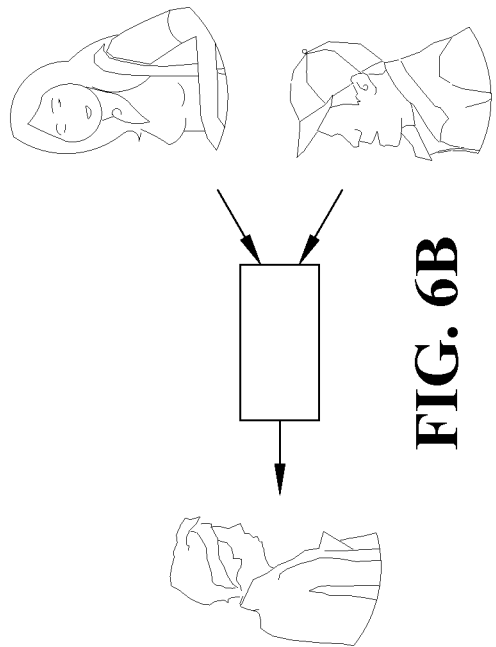
Figure 6A:
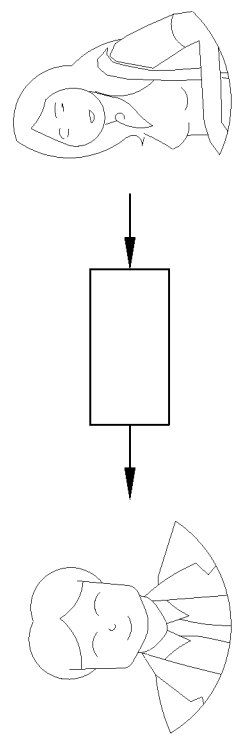
Figure 6C:
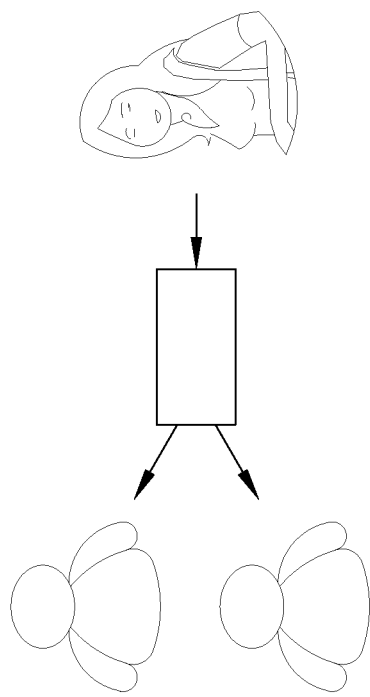

In addition to the aforementioned exemplar of a single leaving leaver and a single target message receiver, the disclosed exemplary embodiments may also be applied to the scenarios of having a plurality of message leavers and target receivers. For example, a scenario having a single message leaver and a plurality of target message receivers may be as follows. Mother inputs a speech message to all the family members "wake everyone up at 6 AM", where the Whom is all the family members. FIG. 6A-FIG. 6D show a plurality of exemplary schematic views of transmitting and feedback operation, consistent with certain disclosed embodiments. FIG. 6A shows an exemplary one-to-one transmission, where a single message leaver inputs speech message to transmit to a single target message receiver. FIG. 6B shows an exemplary many-to-one transmission, where a plurality of message leavers inputs speech messages to be transmitted to a single target message receiver. FIG. 6C shows an exemplary one-to-many transmission, where a single message leaver inputs a speech message to be transmitted to a plurality of target message receivers. FIG. 6D shows an exemplary one-to-one transmission and feedback, where a single message leaver inputs a speech message and the transmitted message speech is a feed message, directly transmitted back (i.e., feedback) to the message leaver.

The structure and the operation of each module of system 400 for leaving and transmitting speech messages are described as follows.

Figure 7:
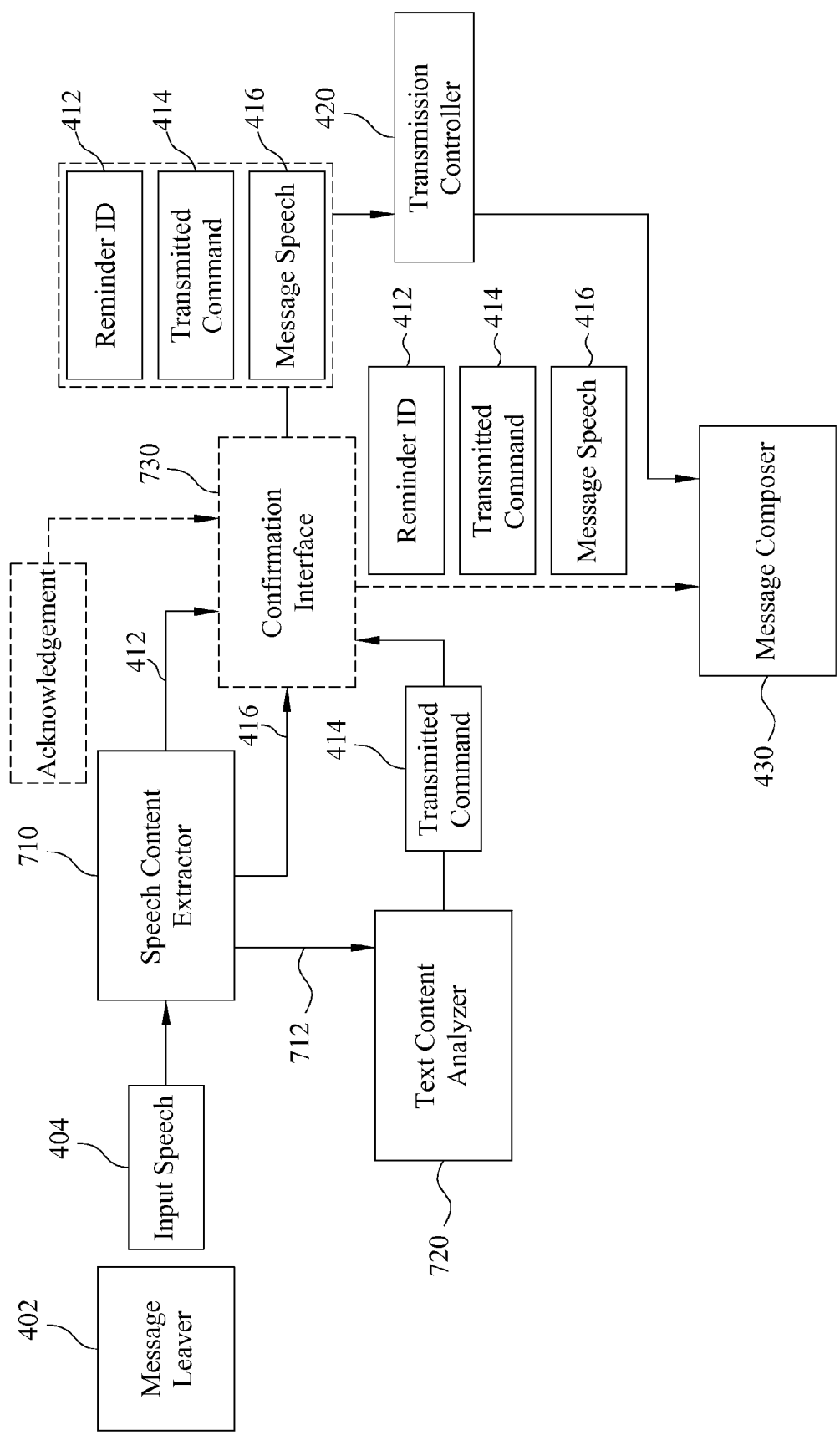
FIG. 7 shows an exemplary schematic view of the structure of command or message parser, consistent with certain disclosed embodiments.

FIG. 7 shows an exemplary schematic view of the structure of command or message parser, consistent with certain disclosed embodiments. Referring to FIG. 7, command or message parser 410 includes a speech content extractor 710 and a text content analyzer 720. Speech content extractor 710 receives input speech 404 from message leaver 402, and extracts reminder ID 412, mix-type text 712 of word and phonetic transcription corresponding to input speech and message speech 416 from input speech 404.

After mix-type text 712 is passed to text content analyzer 720, text content analyzer 720 analyzes the aforementioned Whom, When, How, and so on, transmitting commands 414 from mix-type text 712 (where When and How are optional). Reminder ID 412, message speech 416 and analyzed transmitting commands 414 may be passed to transmitting controller 420 directly or after confirmation. The confirmation is to confirm the accuracy of the transmitted information, and may use confirmation interface 730 to request an acknowledgement.

Figure 8A:
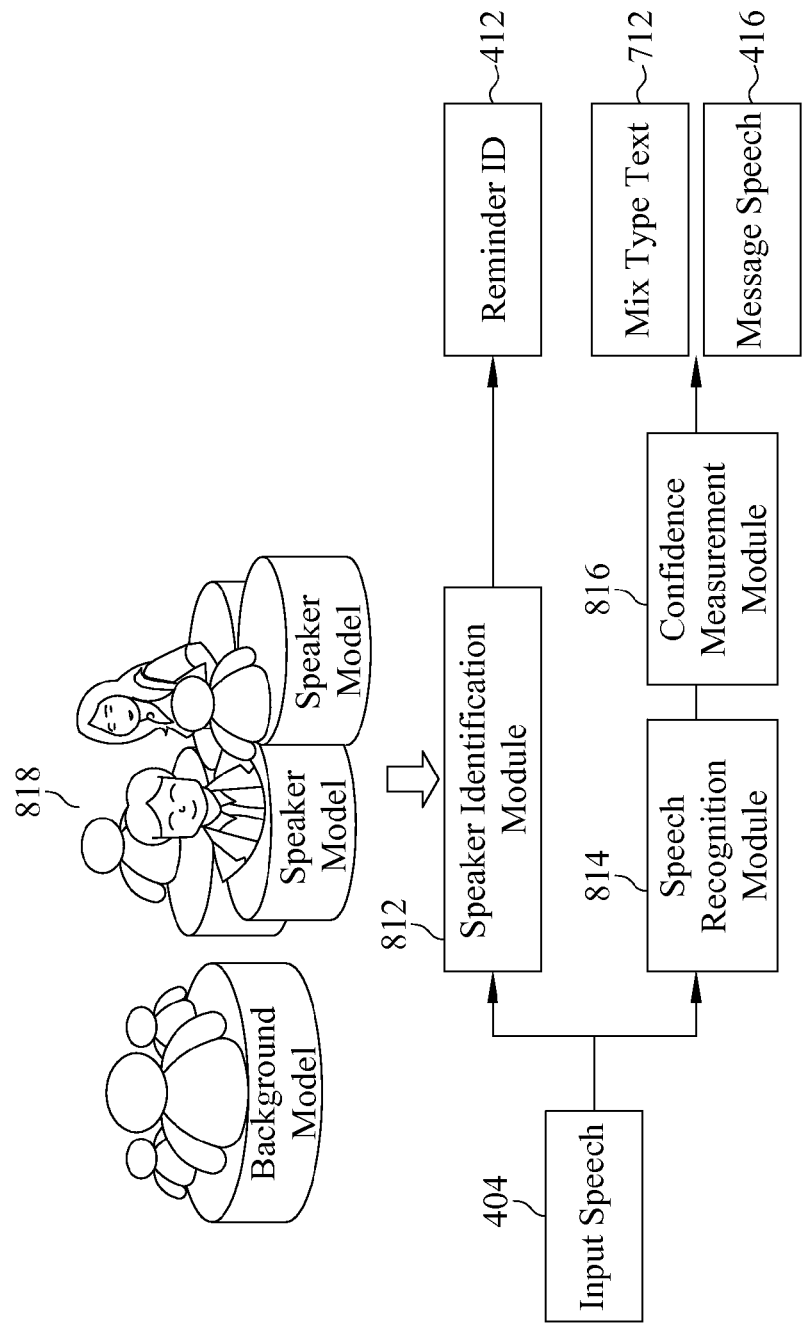
FIGS. 8A-8C show exemplary schematic views of three structures to realize speech content extractor, consistent with certain disclosed embodiments.

Speech content extractor 710 of the disclosed exemplary embodiments may be realized in various architectures. For example, FIG. 8A shows an exemplary structure of using a speaker identification module 812, automatic speech recognition (ASR) 814 and a confidence measure (CM) 816 to realize speech content extractor 710. Speaker identification module 812 and ASR 814 receive input speech 404 respectively. Speaker identification module 812 compares input speech 404 with a pre-trained speech database 818 to find the closest in order to identify the reminder identity 412. ASR 814 performs recognition on input speech 404 to generate mix type text 712. Then, CM 816 performs authentication on input speech and mix type text 712 to generate confidence measure corresponding to each mix type text and extracting message speech 416.

Figure 8B:
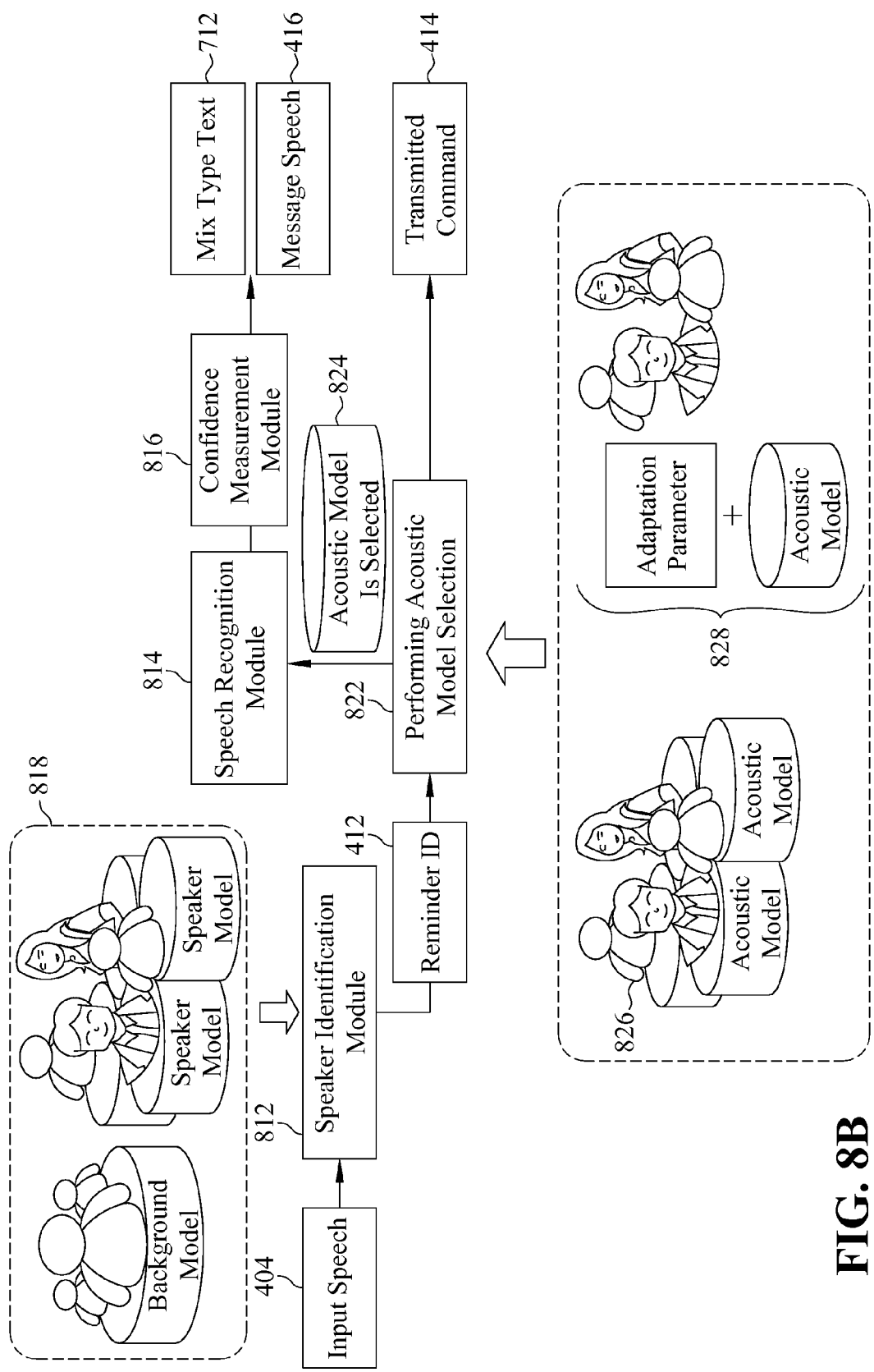

The exemplary structure in FIG. 8B differs from that in FIG. 8A in that speaker identification module 812 performs speaker identification on input speech 404 first. In addition to direct output, the identified speaker may also be used to select the acoustic model or acoustic model with adaptation parameters corresponding to the speaker. For example, in performing acoustic model selection 822, acoustic model 826 is selected (marked as 824) from the acoustic model or acoustic model with adaptation parameters 828 corresponding to the speaker for the subsequent use by ASR 814 to improve the recognition rate.

Figure 8C:
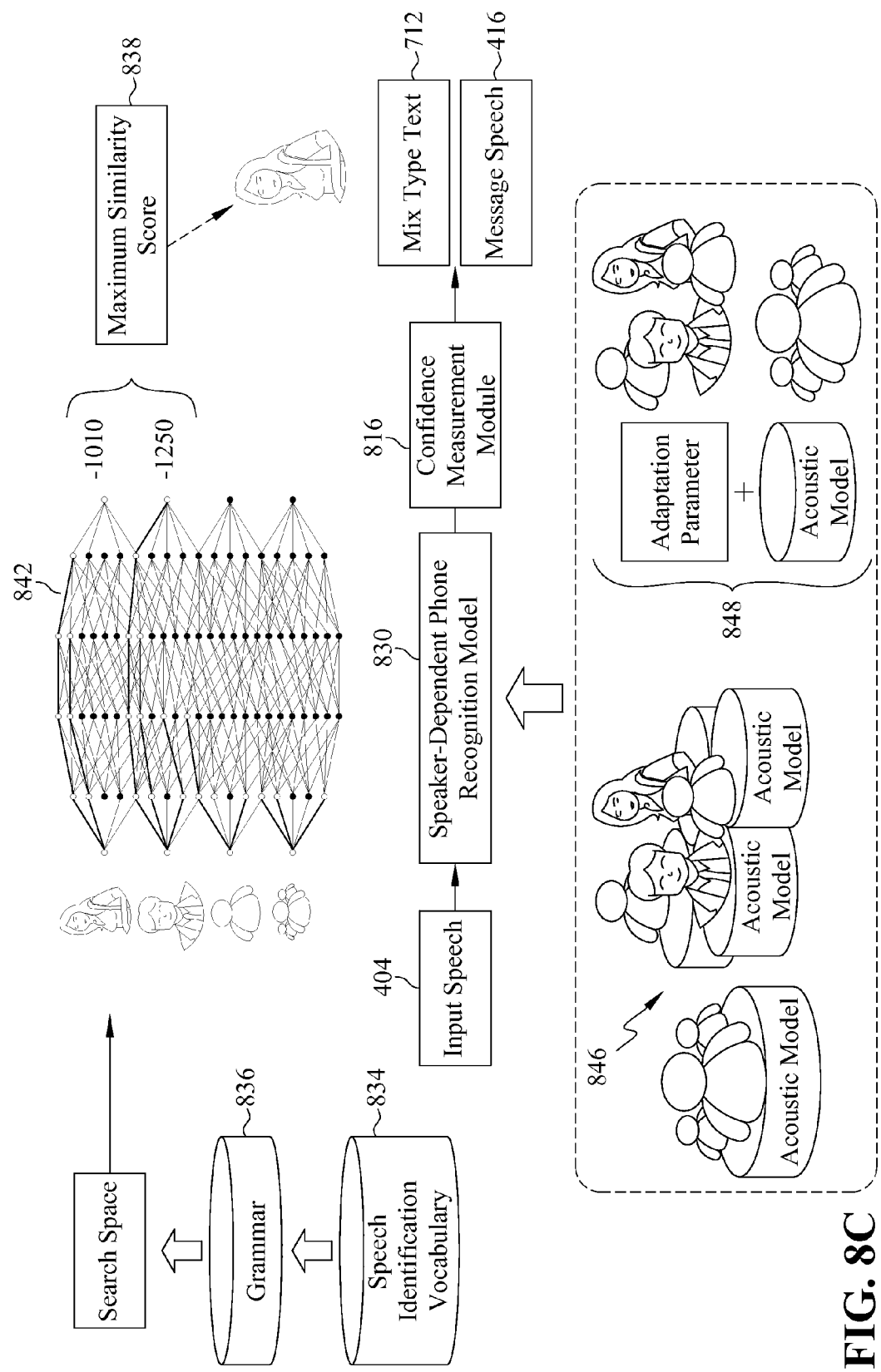

The exemplary structure of FIG. 8C uses a speaker-dependent ASR 830 and CM 816 for processing, where search space 842 used by speaker-dependent ASR 830 in performing recognition is constructed by speech recognition vocabulary 834, grammar 836, pre-trained acoustic model 846 or acoustic model with adaptation parameters 848 corresponding to speaker. Then, a path 838 with the maximum likelihood score is found in search space 842. Path 838 is then followed to obtain corresponding mix type text 712 and corresponding reminder, such as, mother. Then, through CM 816, message speech and mix type text 712 are authenticated to generate confidence corresponding to mix type text 712 for further extracting message speech 416.

FIG. 9 shows an exemplary schematic view of data structure of mix type text, consistent with certain disclosed embodiments. Referring to FIG. 9, the data structure of mix type text may include eight kinds of tag information. The eight kinds of tag information are: _Date_for date, such as Monday, January, first day, and so on; _Time_for time, such as one o'lock, 10 minutes, 10 seconds; _Cmd_for command, such as, speak, say, remind, notify; _Whom_for the target message receiver, such as, dad, mother, brother; _How_for message transmission style, such as, call by phone, mail, broadcast; _F/S_for function word and stop word, function words, such as, remember to, help me to, and stop word including two types, the first being common words found in web search, which search engine would ignore to accelerate, and the second type including interjections, adverbs, proposition, conjunction, and so on. The stop word in the disclosed exemplary embodiments includes the second type, such as, later, but, in a moment, or so; Filler for filler, such as, basic-syllable, phone, filler words; _Y/N_for confirmation word, such as, yes, no, wrong. The confirmation word is the command or the response after message parser 410 executes conformation.

Figure 10:
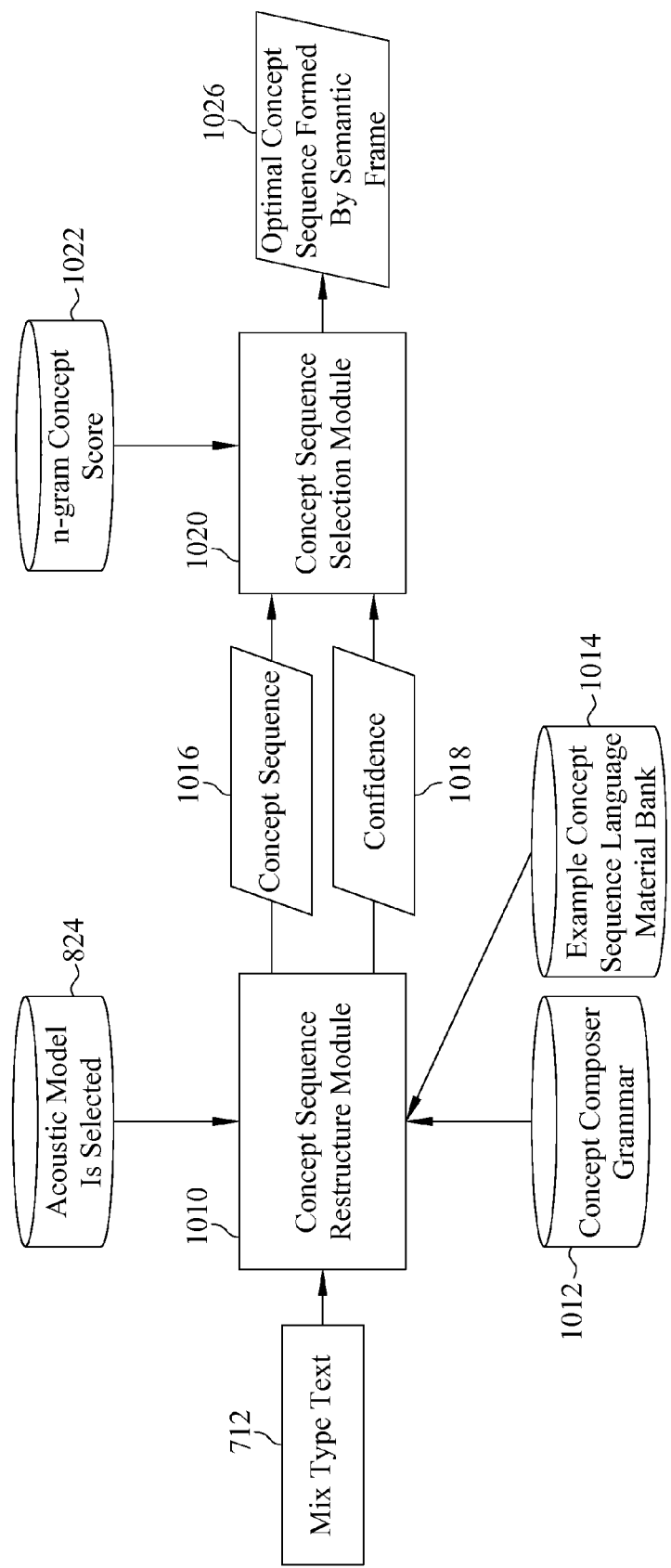
FIG. 10 shows an exemplary schematic view of the structure of text content analyzer, consistent with certain disclosed embodiments.

Text content analyzer 720 analyzes mix type text 712 from speech content extractor 710. The analysis may be trained online or offline, including eliminating unnecessary text message from mix type text according to collected speech material and grammar, and re-organizing into concept sequence formed by semantic frame. As shown in FIG. 10, text content analyzer 720 may further include a concept sequence restructure module 1010 and a concept sequence selection module 1020.

Concept sequence restructure module 1010 may use concept composer grammar 1012, example concept sequence speech material bank 1014 and message or garbage grammar 1024 to restructure the mix type text extracted from speech content extractor 710 to generate all concept sequences 1016 matching example concept sequence and compute confidence 1018 of all concepts in the concept sequences after restructure. Concept sequences 1016 and obtained confidence 1018 are transmitted to concept sequence selection module 1020. Concept sequence selection module 1020 may use n-gram concept score 1022 to select an optimal concept sequence 1026 formed by semantic frame. Optimal concept sequence 1026 formed by semantic frame and corresponding confidence may be transmitted to confirmation interface 730.

Figure 11:
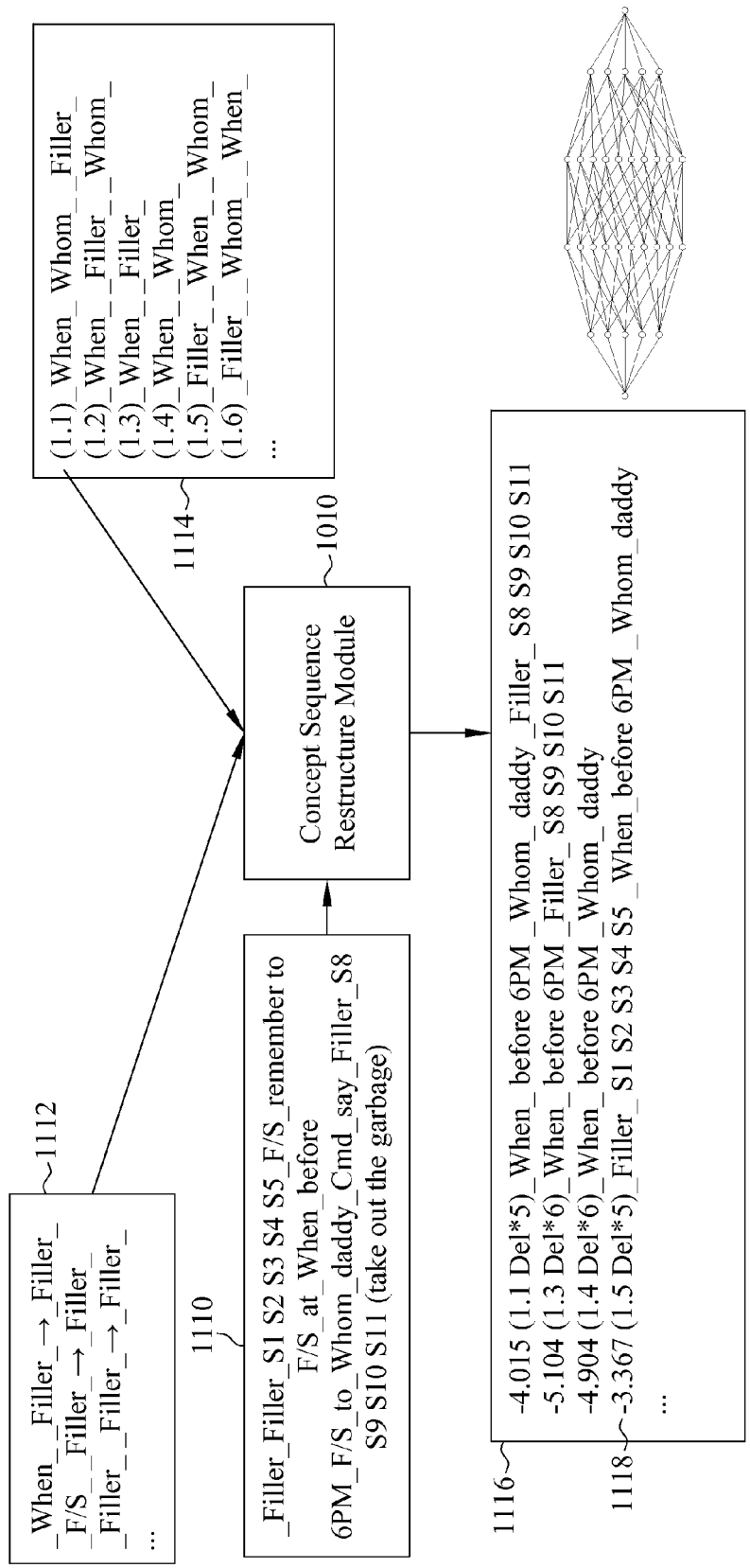
FIG. 11 shows an exemplary schematic view of using an exemplary mix type text to describe how a concept sequence restructure module rearranging and analyzing mix type text, consistent with certain disclosed embodiments.

FIG. 11 shows an exemplary schematic view of using an exemplary mix type text to describe how concept sequence restructure module 1010 rearranging and analyzing mix type text, consistent with certain disclosed embodiments. In FIG. 11, exemplary mix type text 1110 from speech content extractor 710 is "_Filler_Filler_S1 S2 S3 S4 S5_F/S_remember to F/S_at_When_before 6 PM_F/S_to_Whom_daddy_ Cmd_say_Filler_S8 S9 S10 S11 (take out the garbage)". Concept sequence restructure module 1010 may use, such as example 1112 of concept composer grammar 1012 and example 1114 of example concept sequence speech material bank 1014, to restructure and generate a plurality of concept sequences matching exemplary concept sequence and computed confidence values, marked as 1116, where symbol <Del*n> indicates to execute n deletions on the example of the example concept sequence speech material bank. For example, exemplary mix type text 1110 is restructured through exemplary concept composer grammar 1112 and the example of concept sequence speech material bank example 1114 (1.5)_Filler_When_Whom and four times of deletions to generate concept sequence, marked as 1118, i.e., "(1.5Del*n)_Filler_S1 S2 S3 S4 S5_When_before 6 PM_Whom_daddy". Another operation of restructuring example concept sequence speech material bank is <Ins*n>, which means n insertions. Therefore, when speech content extractor 710 has erroneous recognition, the subsequent part may still obtain the same concept sequence as the error-free recognition through the assistance of concept composer grammar 1012 and example concept sequence speech material bank 1014, and not affected by the erroneous recognition of vocabulary and phones.

After concept sequence restructure module 1010 generates all concept sequences matching example concept sequence, concept sequence restructure module 1010 computes the confidence corresponding to the concept sequence with following formula:

Score1(edit)=Σ log($P$(edit|concept not belonging to _Filler_))+Σ log($P$(edit|_Filler_belonging to message))+Σ log($P$(edit|_Filler_belonging to garbage))

Take the concept sequence marked by 1118 as example, whose confidence is computed as:

Confidence=Σ log($P$(Del|__F/S_))+Σ log($P$(Del|__F/S_))+Σ log($P$(Del|__F/S_))+Σ log($P$(Del|_cmd_))+Σ log($P$(Del|_Filler belonging to garbage_))=(−0.756)+(−0.756)+(−0.756)+(−0.309)+(−0.790)=−3.367

Figure 12:
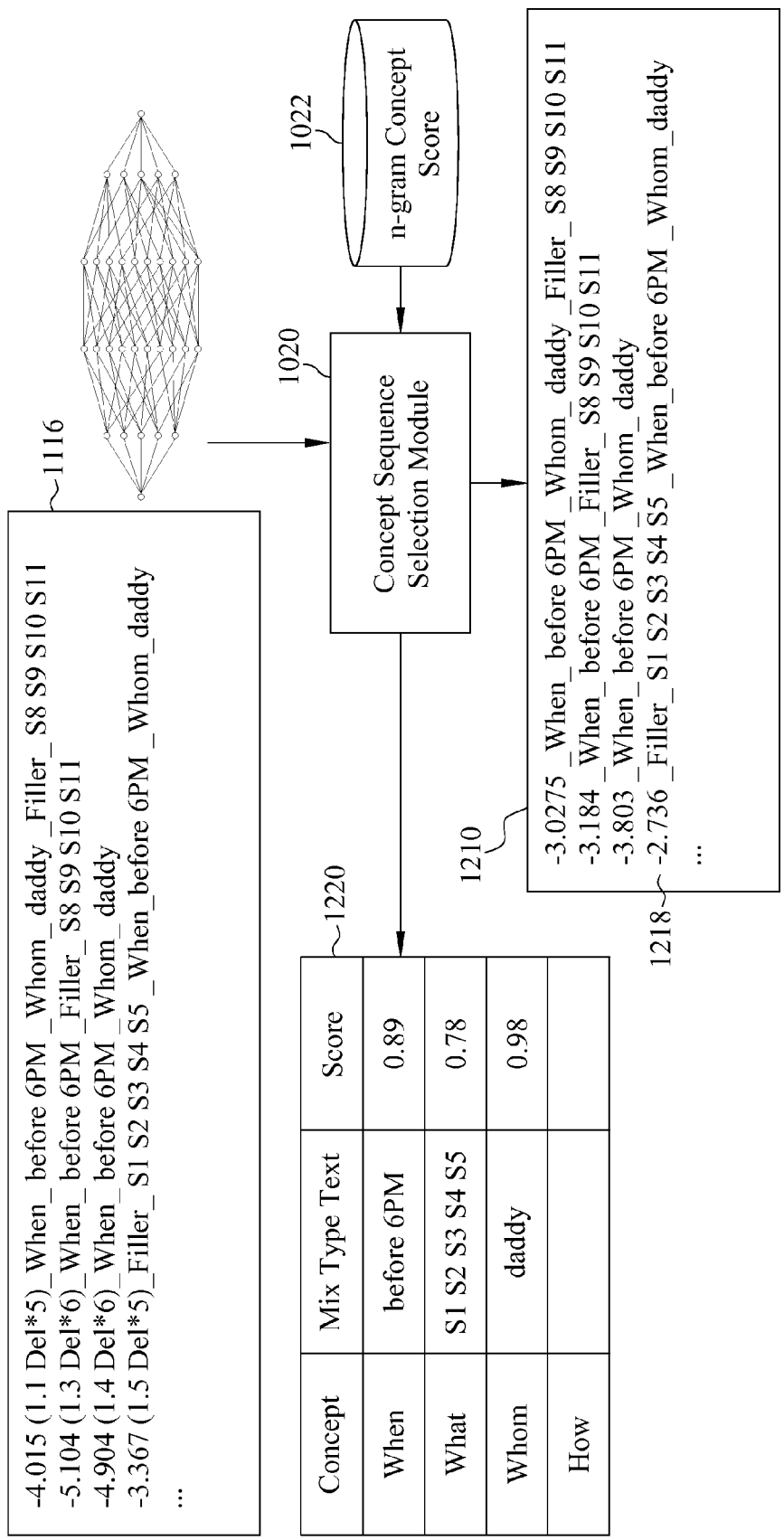
FIG. 12 shows an exemplary schematic view of a concept sequence selection module on how to compute scores for concept sequences, consistent with certain disclosed embodiments.

All the concept sequences and obtained confidence are transmitted to concept sequence selection module 1020. FIG. 12 shows an exemplary schematic view of a concept sequence selection module on how to compute scores for concept sequences, consistent with certain disclosed embodiments. In FIG. 12, concept sequence selection module 1020 may use n-gram concept score 1022 and message distinguish grammar information to perform concept score computation for the concept sequences. Take the above concept sequence "_Filler_S1 S2 S3 S4 S5_When_before 6 PM_Whom_daddy" as an example, the n-gram concept score is computed as follows:

Score2($n$-gram concept)=log($P$(Filler_|null))+ log($P$(_When_|_Filler,null))+ Log($P$(_Whom_|_When_,_Filler_,null))=log (0.78)+log(0.89)+log(0.98)=−2.015

As concept table 1220 shows, in concept sequence "_Filler_S1 S2 S3 S4S5_When_before 6 PM_Whom_daddy", concept (What) is "S1 S2 s3 S4 S5", with score 0.78. Concept (Whom) is "daddy" with score 0.89, and concept (When) is "before 6 PM", with score 0.98.

With these concept sequences and corresponding concept scores, the total score of each concept sequence may be computed from confidence and concept score, as follows:
Total score=w1*Score1(edit)+w2*Score2(n-gram concept), where w1+w2=1,w1>0, w2>0. Take concept sequence 1118 as example, where the total score is 0.5*(−3.367)+0.5*(−2.015)=−2.736. With these concept sequences and corresponding total scores, such as example 1210, concept sequence selection module 1020 may select at least an optimal concept sequence formed by semantic frame for transmission to conformation interface 730. The optimal concept sequence, marked as arrow 1218, has the highest total score of −2.736.

Figure 13A:
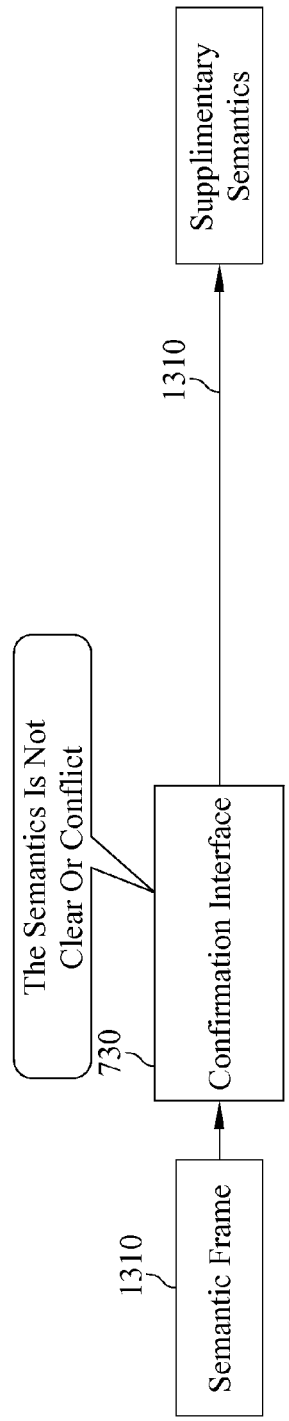
FIGS. 13A-13C show exemplary schematic views of input/output of confirmation interface, consistent with certain disclosed embodiments.
Figure 13B:
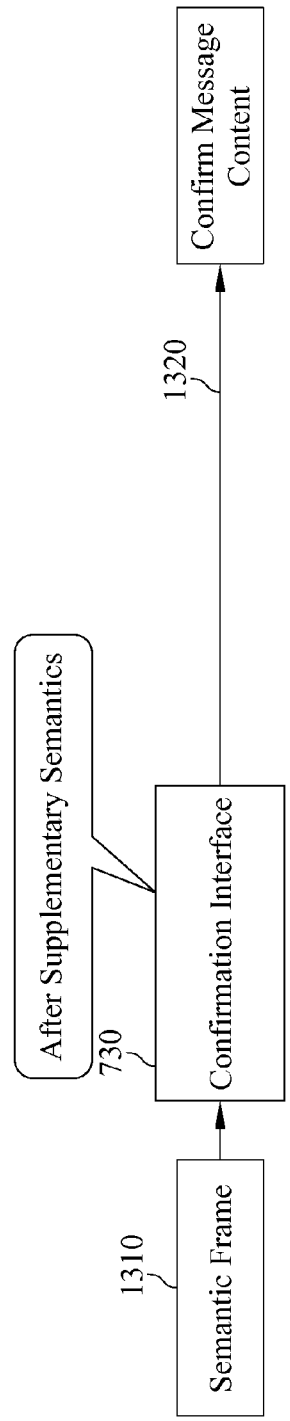
Figure 13C:
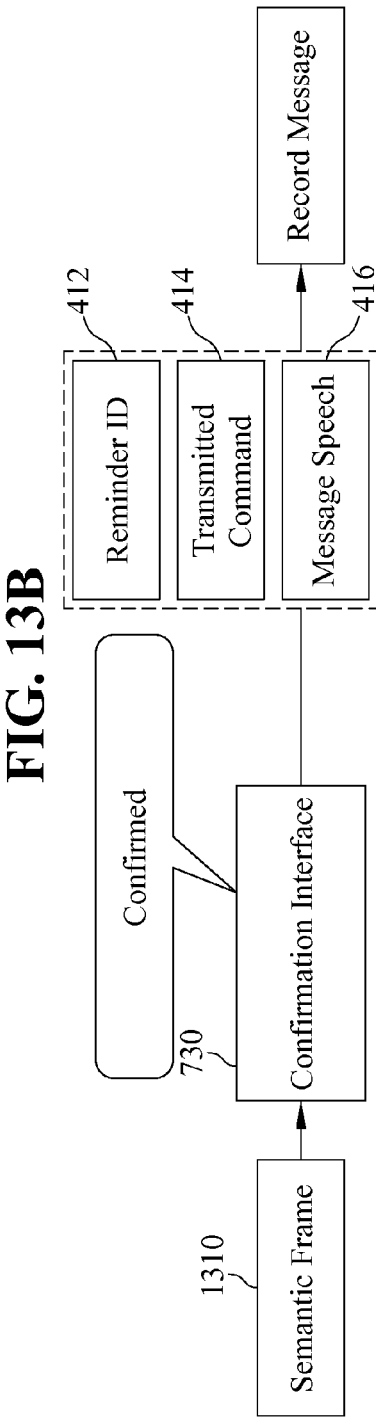

Confirmation interface 730 confirms whether the semantics obtained by text content analyzer 720 is not clear, conflict or whether the semantic conveys the requirements of reminder. When the above situation is negative, FIGS. 13A-13C show exemplary schematic views of input/output of confirmation interface, consistent with certain disclosed embodiments. As shown in FIG. 13A, if the semantics of semantic frame 1310 received by confirmation interface 730 is not clear or conflict, such as, confidence between high threshold and low threshold, confirmation interface 730 may request a response message 1310. Based on the received response message 1310, additional semantics is supplied. The Not Clear semantic, such as, "inform daddy before 6 PM", does not include necessary concept semantics. In the above example, the missing necessary concept is What, i.e., the speech message. The conflict semantic, such as, is a case when the same concept appears more than once. For example, in the previous dialogue, concept When is "before 6 PM", and in the current dialogue, concept When is "before 6:30 PM", different contents for the same concept When.

After semantics are supplemented, such as, semantic clear, as shown in FIG. 13B, confirmation interface 730 may execute confirmation 1320 to confirm whether the reminder is complete and correct. If confirmed, confirmation interface 730 may record reminder ID 412, transmitted command 4141 and message speech 416, and transmit them to transmission controller 420. If not confirmed, confirmation interface 730 may request new input message speech.

Figure 14:
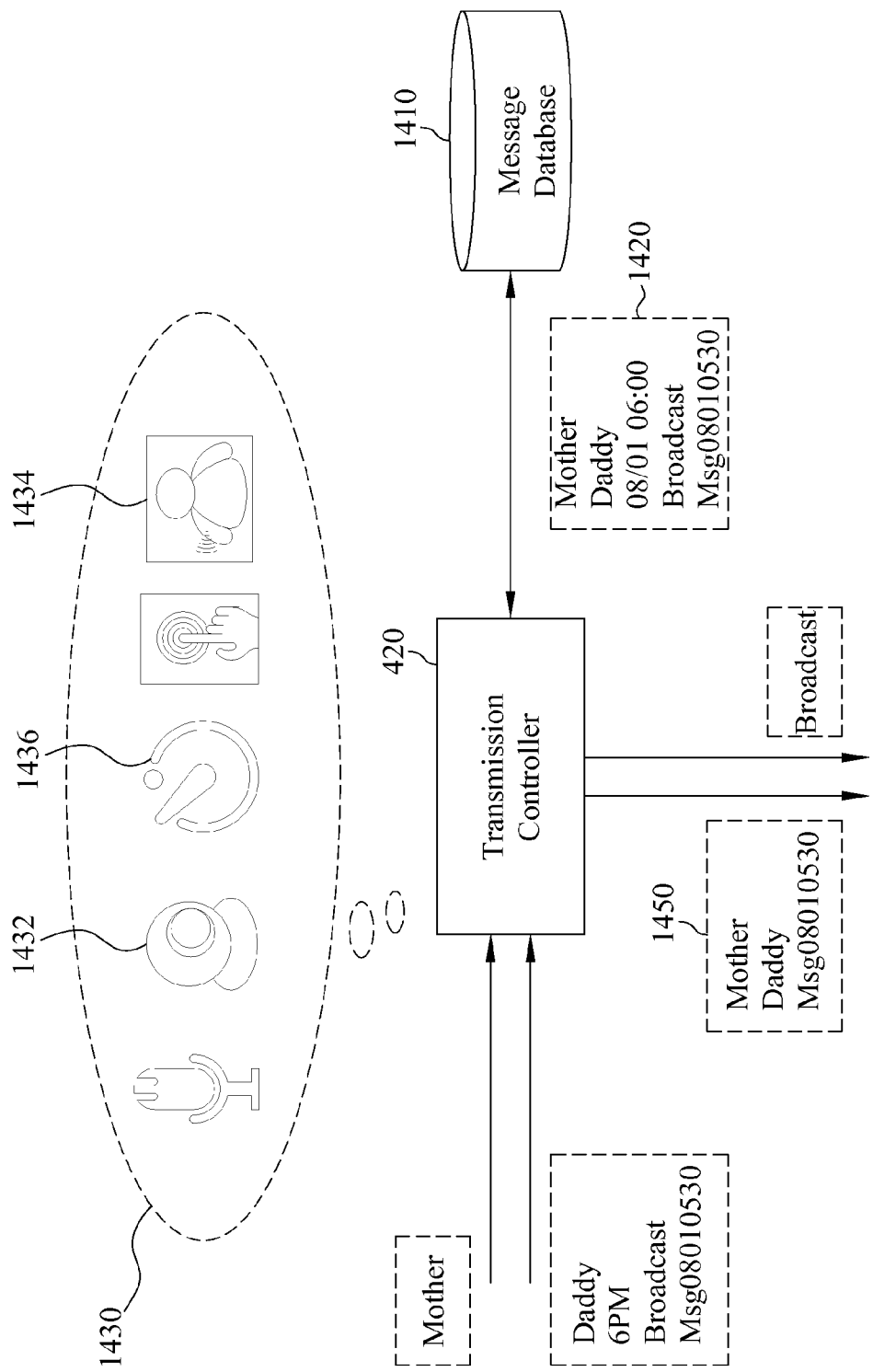
FIG. 14 shows an exemplary schematic view of the operation of transmission controller, consistent with certain disclosed embodiments.

In review of exemplary embodiment of FIG. 5, in the transmitting stage, after transmission controller 420 receives information related to message and transmitting passed by command or message parser 410, transmission controller 420 determines whether the transmitting conditions are met, and then transmits the message through message transmitting device 440. FIG. 14 shows an exemplary schematic view of the operation of transmission controller, consistent with certain disclosed embodiments.

In FIG. 14, transmission controller 420 may record the information related to reminder and transmitting passed by command or message parser 410 to a message database 1410. For example, transmission controller 420 stores speech message record 1420 corresponding to the received reminder ID "mother(Who)" and transmitted command, including "daddy (Whom)", "before 6 PM(When)", "broadcast(How)" and "signal08010530(What)", to message database 1410, and through sensor device 1430, such as, camcorder 1432 or RFID 1434, to confirm whether daddy is back at home. When timer 1436 confirms that transmitting conditions are met (When (before 6 PM)), reminder ID "mother(Who)", "daddy (Whom)", and "signal08010530(What)" are transmitted to message composer 430 and, based on "broadcast (How)", corresponding device switch is activated.

Figure 15:
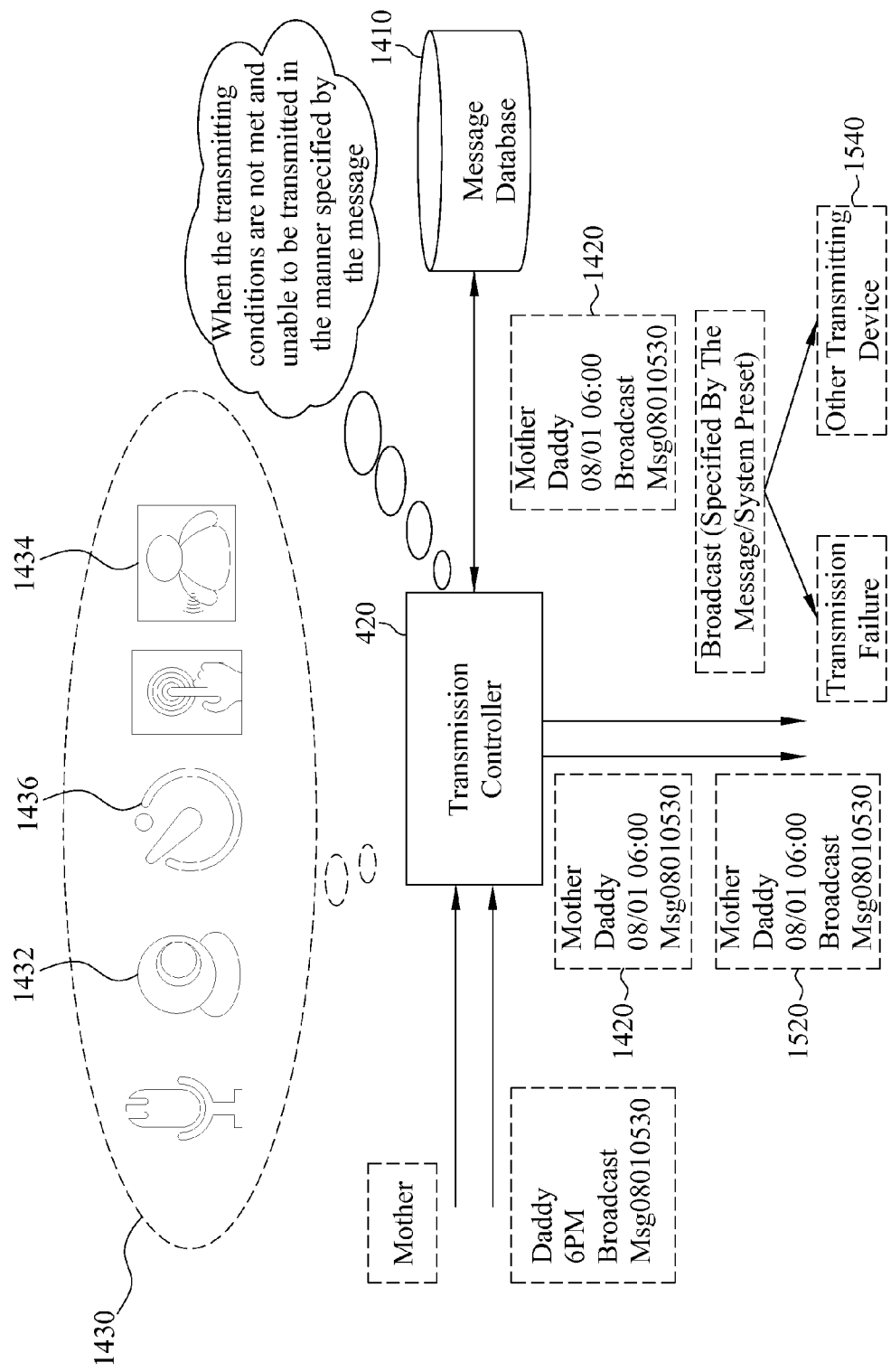
FIG. 15 follows the exemplar of FIG. 14 to illustrate the operation of transmission controller when transmitting conditions are not met, consistent with certain disclosed embodiments.

In actual applications, the transmitting conditions in the input speech left by the reminder may not be always satisfied. For example, daddy is not at home before 6 PM. In this condition, the message may not be told to the message receiver. Therefore, as shown in FIG. 15, transmission controller 420 may use the transmitting order preset by the system to set the message transmission device to avoid the above condition of no message receiver for the message. For example, the system preset may set the transmitting order as: when timer 1436 confirms transmitting condition When (before 6 PM), and camera 1432 or RFID 1434 could not find daddy, transmission controller 420 feeds back speech message record 1420 and changes "broadcast (How)" to system preset "speech SMS", and activates corresponding device switch so the transmitted message speech composed by message composer 430, i.e., feedback message 1520 may be transmitted through non-broadcast other transmitting device 1540 in a speech Short Message Service (SMS) manner preset by the system. Feedback message 1530 may be fed back to message leaver or message receiver (daddy) to assure that the transmitted message is not left out.

In other words, when the transmitting conditions are not met and the transmitting cannot be accomplished by the designated manner, such as, the message cannot be broadcast to target message receiver (daddy), transmission controller 420 may set the message transmitting device as "system preset" transmitting manner and uses other transmitting device 1540 to transmit to assure the transmission.

Figure 16:
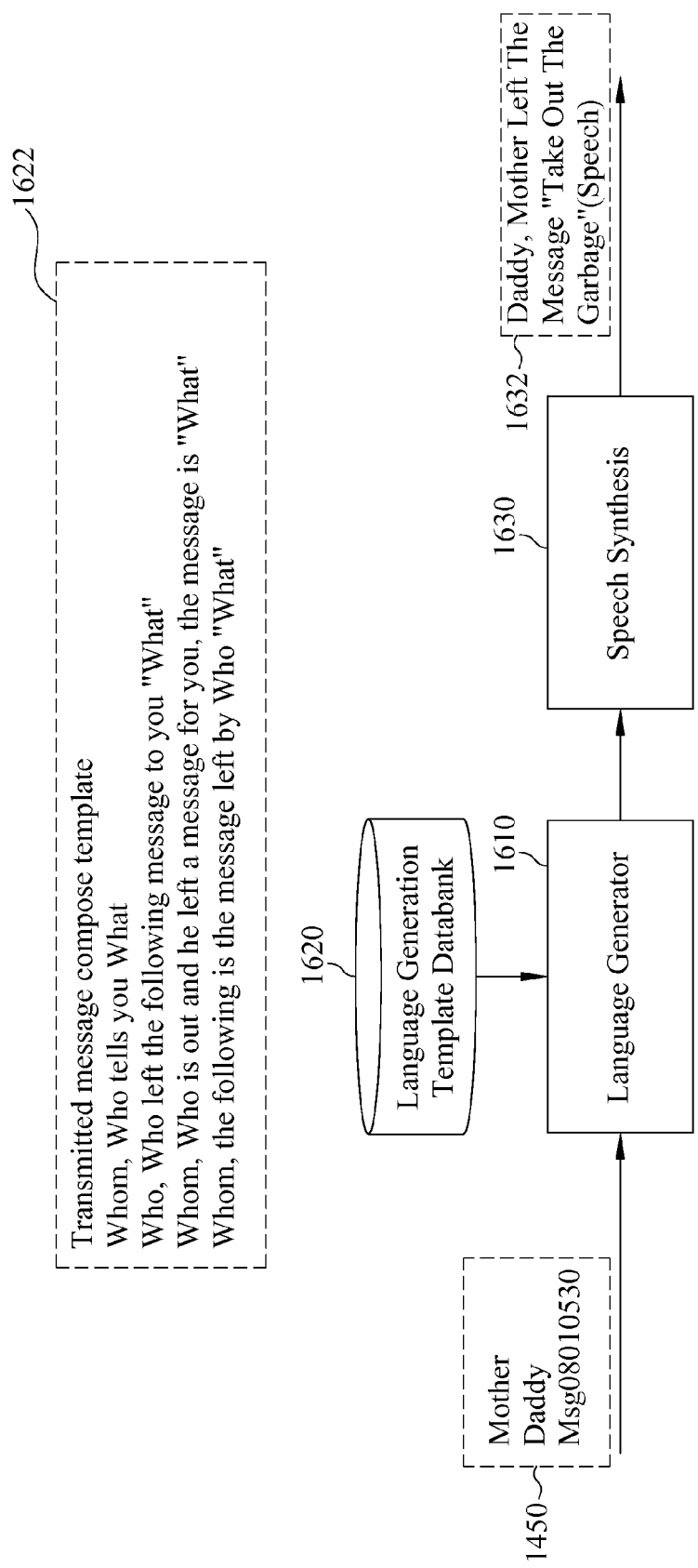
FIG. 16 shows an exemplary schematic view of message composer, consistent with certain disclosed embodiments.

Message composer receives from transmission controller 420 information 1450 of reminder ID (Who), message receiver (Whom), speech message (What), and uses language generation technique to rearrange the information into a meaningful sentence, and converts the generated sentence into message speech 432 for message transmitting device 440 to transmit to a message receiver. FIG. 16 shows an exemplary schematic view of message composer, consistent with certain disclosed embodiments. Following the exemplary structure in FIG. 14, the operation of message composer 420 is as follows.

In FIG. 16, message composer 420 at least includes a language generator 1610, and at least a speech synthesis 1630. Language generator 1610 receives from transmission controller 420 information 1450 of reminder ID "mother (Who)", message receiver "daddy (Whom)" and speech message "signal 08010530 (speech message)", and selects a compose template from a language generation template (LGT) database 1620, such as compose template database example 1622, for composing sentence.

For example, when the transmitting conditions are met, language generator 1610 selects a compose template "Whom, Who left the following message for you 'what'". Take information 1450 as example. The speech signal will be generated "daddy, mother left you the following message 'What'", and then uses speech synthesis 1630 to synthesize into a speech signal. After that, speech synthesis 1630 performs concatenation on the speech signal and speech message (What) "signal 08100530" to generate transmitted message 1632 of "Daddy, mother left the following message for you, 'time to take out garbage'", where 'time to take out garbage' is an exemplary content for signal 08100530. Transmitted message 1632 is then transmitted through message transmitting device to the message receiver, such as, "daddy (Whom)".

Figure 17:
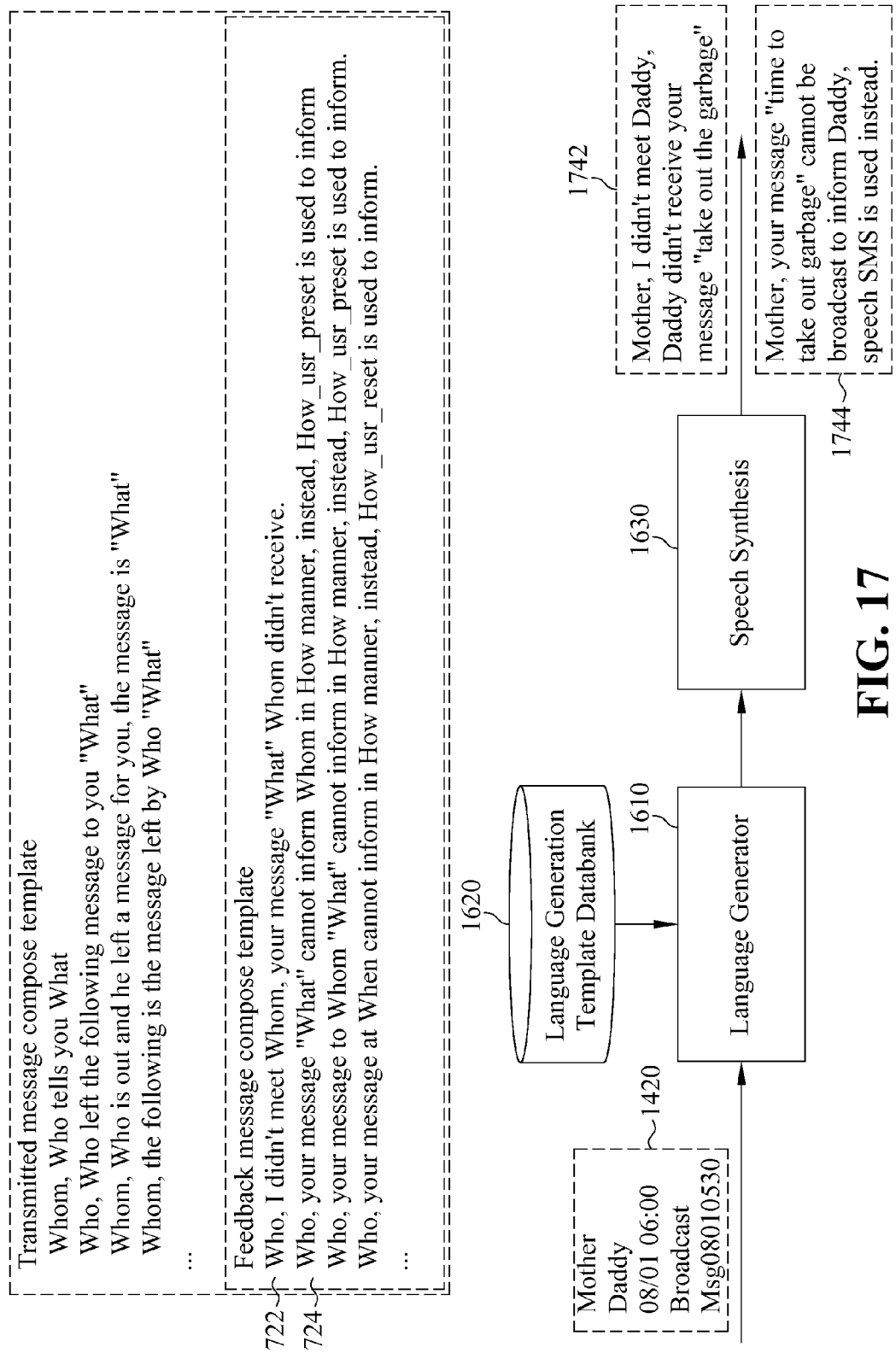
FIG. 17 shows an exemplary schematic view of the operation of message composer when transmitting conditions not met and unable to transmit in a manner specified by the reminder, consistent with certain disclosed embodiments.

When the transmitting conditions are not met, for example, the transmitting cannot be accomplished within the set time in a manner specified by the reminder, as shown in FIG. 17, message composer 430 receives speech message record 1420 feedback by transmission controller 420 and selects a feedback message compose template 1722 from a language generation template database 1720 for sentence composition to compose a feedback message 1742. If transmitting controller 420 has set the message transmitting device as a transmitting manner of system preset, such as, speech SMS, another feedback message compose template 1724 may be selected from language generation template database 1720 to compose a feedback message 1744.

Figure 18:
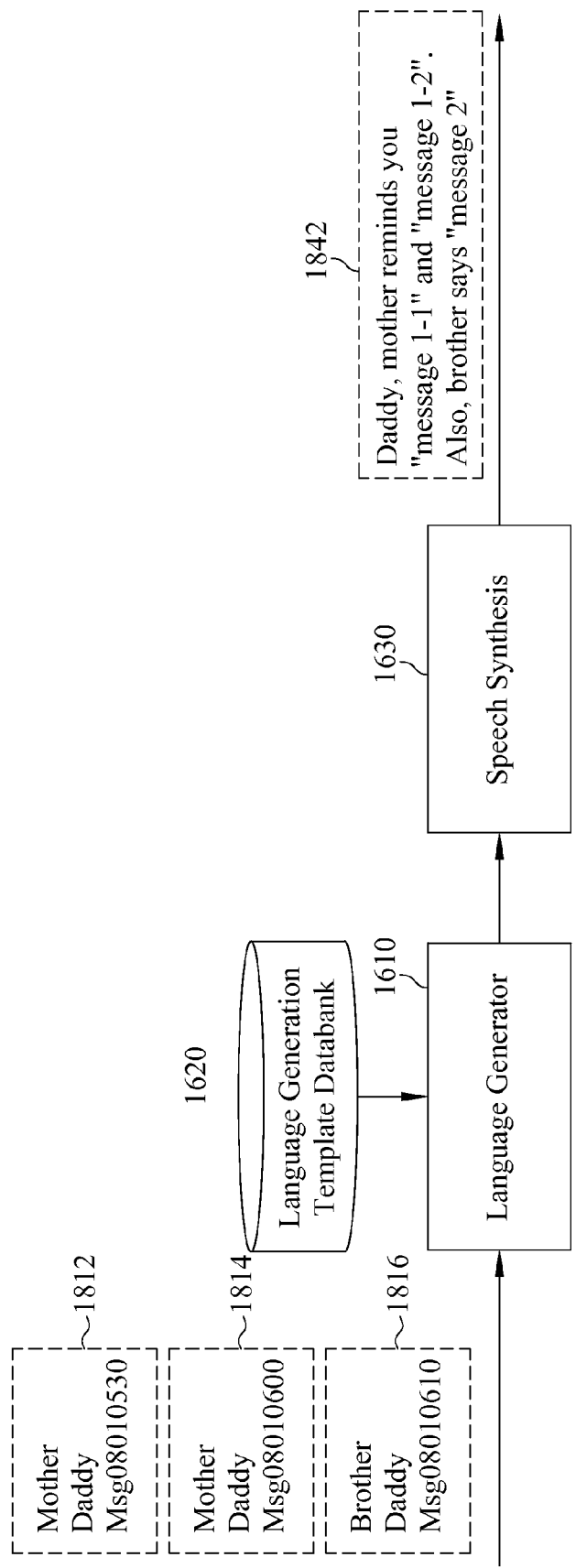
FIG. 18 shows an exemplary schematic view of message composer performing sentence composition when a plurality of message leavers inputting speech messages to a single message receiver, consistent with certain disclosed embodiments.

FIG. 18 shows an exemplary schematic view of message composer performing sentence composition when a plurality of message leavers inputting speech messages to a single message receiver, consistent with certain disclosed embodiments. Referring to FIG. 18, message composer 430 receives three parsed speech message records 1812, 1814, 1816, where two reminder IDs are "mother" and "brother", and the message receiver is "daddy". "mother" left two messages and "brother" left one message. Message composer 430 may select a transmitted message compose template from a language generation template database and compose three message records 1812, 1814, 1816 into a transmitted message speech, marked as 1842; that is, "Daddy, mother reminds you of 'message 1-1' and 'message 1-2', and brother says 'message 2'.

Figure 19:
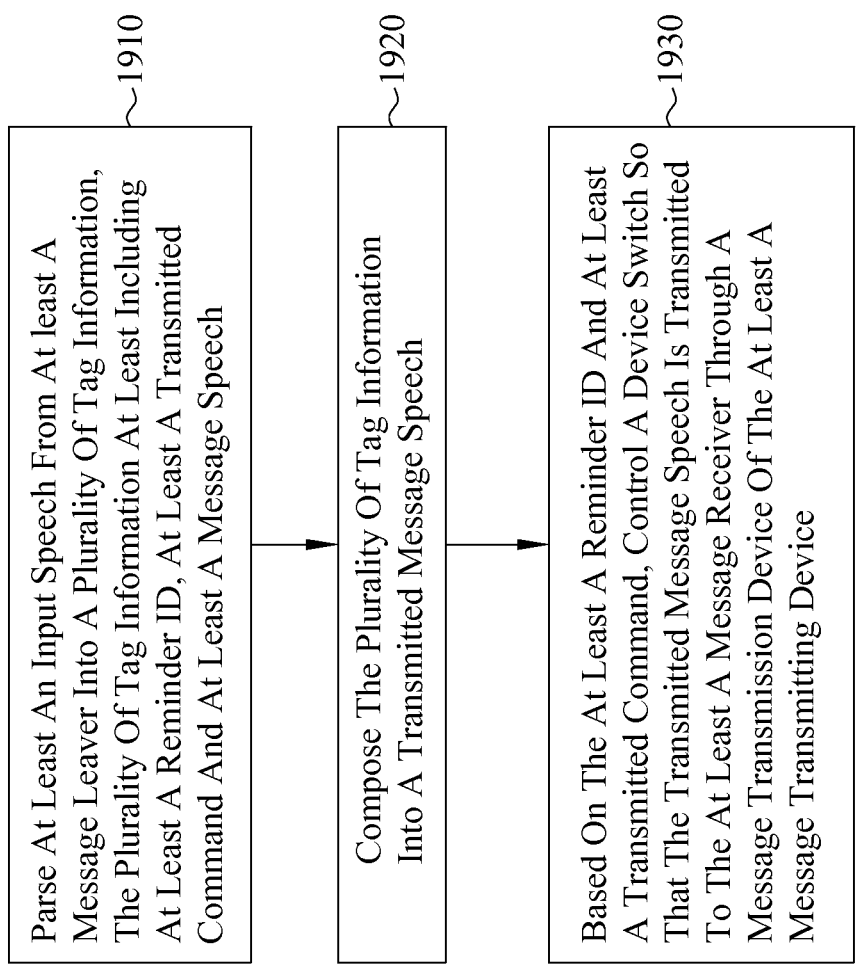
FIG. 19 shows an exemplary flowchart of a method for leaving and transmitting speech message, consistent with certain disclosed embodiments.

FIG. 19 shows an exemplary flowchart of a method for leaving and transmitting speech message, consistent with certain disclosed embodiments. Referring to FIG. 19, at least an input speech is parsed and a plurality of tag information is outputted. The tag information at least includes at least a reminder ID, at least a transmitted command and at least a message speech, as shown in step 1910. In step 1920, the plurality of tag information is composed into a transmitted message speech. As shown in step 1930, based on the at least a reminder ID and at least a transmitted command, it may control a device switch so that the transmitted message speech is transmitted to at least a message receiver through a message transmission device of the lat least a message transmitting device. Before transmitting the transmitted message speech, a confirmation interface may be used to execute a confirmation to assure the correctness of the plurality of tag information or the transmitted message speech.

In step 1910, based on the given confidence measure of grammar and speech, at least a text command segment with high confidence and at least a filler segment with phonetics may be obtained from the entire input speech segment. Also, the filler segment may be distinguished into message filler segment and garbage filler segment. At least a transmitted command may be obtained from at least a text command segment. Based on the message filler segment, at least a message speech may be extracted from the input speech.

In step 1920, based on the plurality of tag information, a compose template may be selected from a language generation template database for composing transmitted message speech. The language generation template database may include, such as, a plurality of transmitted message composed templates or a plurality of feedback message composed templates.

In step 1930, based on reminder ID and transmitted command, it may control message transmitting device for transmitting the message speech. For example, when the transmitting conditions are met, a manner specified by the reminder may be used to accomplish transmitting the transmitted message speech. When the transmitting conditions are not met and a manner specified by the reminder cannot be used to accomplish transmitting the message, the message transmitting device may be set to "system preset" and accomplish transmitting through other transmitting devices to assure the transmitting of messages.

In summary, the disclosed exemplary system and method for leaving and transmitting speech messages may use a command or message parser to parse the input speech to obtain reminder ID. Also, based on given grammar and speech confidence measure, it may obtain text command segment and filler segment from the entire speech input segment, and then distinguish the filler segment into message filler segment and garbage filler segment. By obtaining all types of transmitted command from the text command segment, and based on the message filler segment, the disclosed exemplary embodiments may extract message speech from input speech. Through a message composer, a transmitted message speech is composed and transmitted to message receiver based on reminder ID and transmitted command to control the message transmitting device.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A system for leaving and transmitting speech messages, comprising:
   a command or message parser for parsing at least an input speech of at least a reminder and outputting a plurality of tag information from said at least an input speech, said plurality of tag information at least including at least a reminder identity (ID), at least a transmitted command and at least a message speech;
   a message composer connected to said command or message parser for composing said plurality of tag information into a transmitted message speech;
   at least a message transmitting device; and
   a transmission controller connected to said command or message parser, based on said at least a reminder ID and said at least a transmitted command, controlling a device switch so that said transmitted message speech being transmitted by a message transmitting device of said at least a message transmitting device to at least a message receiver;
   wherein said command or message parser further includes:
   a text content analyzer for analyzing mix type text extracted from said at least an input speech to obtain said at least a transmitted command;
   wherein said text content analyzer further includes:
   a concept sequence restructure for re-editing said mix type text to generate a plurality of concept sequences; and
   a concept sequence selection for computing a total score corresponding to each of said plurality of concept sequences and selecting at least an optimal concept sequence formed by a semantic frame;
   wherein said total score corresponding to each concept sequence is computed based on a confidence and a concept score corresponding to said concept sequence.

2. The system as claimed in claim 1, wherein said command or message parser identifies from said at least an input speech said at least a reminder ID, and based on a given grammar and a speech confidence measure, identifies at least a command vocabulary segment and at least a filler segment with at least a phonetic.

3. The system as claimed in claim 2, wherein said at least a filler segment is distinguished into at least a message filler segment or at least a garbage filler segment.

4. The system as claimed in claim 3, wherein said command or message parser identifies from said at least a command vocabulary segment at least a transmitted command, based on said at least a message filler segment, said at least a message speech is extracted from said at least an input speech.

5. The system as claimed in claim 1, wherein said at least a transmitted command further includes at least a target message receiver, when to transmit said at least a speech message to said at least a target message receiver, and in what transmitting manner said at least a speech message is transmitted to said at least a target message receiver.

6. The system as claimed in claim 1, said system is a system with both one side or multiple sides transmitting and feedback capability.

7. The system as claimed in claim 1, wherein said command or message parser further includes:
a speech content extractor for receiving said at least an input speech and extracting from said input speech said reminder ID, mix type text and information of said message speech, said mix type text being mix text information of vocabulary and phonetics corresponding to said input speech.

8. The system as claimed in claim 1, wherein said command or message parser further includes a confirmation interface, said confirmation interface executes a confirmation operation to confirm the correctness of parsed said plurality of tag information.

9. The system as claimed in claim 1, wherein said message composer selects a compose template from a language generation template database for performing sentence composition to compose said transmitted message speech.

10. The system as claimed in claim 1, wherein when a transmitting condition of said at least a transmitted command is not satisfied and is unable to accomplish transmitting, said transmission controller sets said at least a message transmitting device as a system preset transmitting manner and uses another message transmitting device of said at least a message transmitting device to transmit said transmitted message speech.

11. The system as claimed in claim 1, wherein said message composer further includes:
a language generator for receiving said at least a reminder ID, said at least a transmitted command and said at least a message speech, and selecting a compose template to generate a speech signal; and
a speech synthesizer for composing said speech signal and said at least a message speech into said transmitted message speech.

12. The system as claimed in claim 11, wherein said compose template is selected from a language generation template database, said language generation template database includes a plurality of transmitted message compose templates or a plurality of feedback message compose templates, or a plurality of transmitted message compose templates and a plurality of feedback message compose templates.

13. A method for leaving and transmitting speech messages, comprising:
parsing at least an input speech of at least a reminder into a plurality of tag information, said plurality of tag information at least including at least a reminder identity (ID), at least a transmitted command and at least a message speech;
composing said plurality of tag information into a transmitted message speech; and
based on said at least a reminder ID and said at least a transmitted command, controlling a device switch so that said transmitted message speech being transmitted through a message transmitting device of said at least a message transmitting device to said at least a message receiver; and
analyzing mix type text extracted from said at least an input speech;

wherein analyzing said mix type text includes:
re-editing said mix type text to generate a plurality of concept sequences, then computing a corresponding confidence for each of said plurality of concept sequences; and
computing a corresponding concept score of each concept sequence, and based on said corresponding confidence and said corresponding concept score of each concept sequence, computing a total score corresponding to each concept sequence, and selecting at least an optimal concept sequence formed by a semantic frame.

14. The method as claimed in claim 13, further including:
identifying said at least a reminder ID from said at least an input speech;
based on a given grammar and a speech confidence measure, identifying at least a text command segment and at least a filler segment; and
from said at least a text command segment, obtaining said at least a transmitted command, and based on said at least a filler segment, obtaining said at least a message speech.

15. The method as claimed in claim 13, further including:
based on said at least a reminder ID, said at least a transmitted command and said at least a message speech, selecting a compose template from a language generation template database to generate a speech signal; and
composing said speech signal and said at least a message speech into said transmitted message speech.

16. The method as claimed in claim 13, wherein said at least a transmitted command further includes at least a transmitting condition, when said at least a transmitting condition is met, a specified reminder manner is used to accomplish transmitting said transmitted message speech.

17. The method as claimed in claim 16, wherein when a transmitting condition of said at least a transmitting condition is not met and transmitted unsuccessfully, a system preset transmitting manner is used to transmit said transmitted message speech.

18. The method as claimed in claim 13, wherein parsing said at least an input speech of said at least a reminder further includes:
extracting said reminder ID, mix type text and information from said at least an input speech, said mix type text being mix text information of vocabulary and phonetics corresponding to said at least an input speech.

19. The method as claimed in claim 13, further including:
before transmitting said transmitted message speech, using a confirmation interface to execute at least a confirmation operation to confirm correctness of said plurality of tag information or said transmitted message speech.

20. The method as claimed in claim 13, wherein a total score corresponding to each of said plurality of concept sequences is a weighted sum of said corresponding concept score and said corresponding confidence.

21. The method as claimed in claim 16, further including:
determining whether said at least a transmitting condition of said at least a transmitted command is being met via at least a sensor device.

22. The method as claimed in claim 17, wherein said transmitted message speech is a feedback message.

\* \* \* \* \*